(12) United States Patent
Ryan

(10) Patent No.: US 7,631,184 B2
(45) Date of Patent: Dec. 8, 2009

(54) SYSTEM AND METHOD FOR IMPOSING SECURITY ON COPIES OF SECURED ITEMS

(76) Inventor: Nicholas Ryan, 1105 Vasquez Ave., Sunnyvale, CA (US) 94086

( * ) Notice: Subject to any disclaimer, the term of this patent is extended or adjusted under 35 U.S.C. 154(b) by 624 days.

(21) Appl. No.: 10/146,207

(22) Filed: May 14, 2002

(65) Prior Publication Data
US 2003/0217281 A1 Nov. 20, 2003

(51) Int. Cl.
*H04L 9/32* (2006.01)
*H04L 29/06* (2006.01)
*G06F 21/24* (2006.01)

(52) U.S. Cl. .......................... 713/160; 726/32; 713/176
(58) Field of Classification Search ....................... None
See application file for complete search history.

(56) References Cited

U.S. PATENT DOCUMENTS

| | | |
|---|---|---|
| 4,203,166 A | 5/1980 | Eshram et al. |
| 4,734,568 A | 3/1988 | Watanabe |
| 4,757,533 A | 7/1988 | Allen et al. |
| 4,796,220 A | 1/1989 | Wolfe |
| 4,799,258 A | 1/1989 | Davies |
| 4,827,508 A | 5/1989 | Shear |
| 4,888,800 A | 12/1989 | Marshall et al. |
| 4,972,472 A | 11/1990 | Brown et al. |
| 5,032,979 A | 7/1991 | Hecht et al. |
| 5,052,040 A | 9/1991 | Preston et al. |
| 5,058,164 A | 10/1991 | Elmer et al. |
| 5,144,660 A | 9/1992 | Rose |
| 5,204,897 A | 4/1993 | Wyman |
| 5,220,657 A | 6/1993 | Bly et al. |
| 5,235,641 A | 8/1993 | Nozawa et al. |
| 5,247,575 A | 9/1993 | Sprague et al. |
| 5,276,735 A | 1/1994 | Boebert et al. |

(Continued)

FOREIGN PATENT DOCUMENTS

EP  0 672 991 A2  9/1995

(Continued)

OTHER PUBLICATIONS

"Inside Encrypting File System," Part 1, from MSDN Oct. 2001 version, exact publication date is unknown but believed prior to Dec. 12, 2001.

(Continued)

*Primary Examiner*—Christopher A Revak
(74) *Attorney, Agent, or Firm*—Sterne Kessler Goldstein & Fox PLLC

(57) ABSTRACT

Improved approaches for securing files that are derived from secured files are disclosed. In general, a secured file can only be accessed by authenticated users with appropriate access rights or privileges. Each secured file is provided with a header portion and a data portion, where the header portion contains, or points to, security information. The security information is used to determine whether access to associated data portions of secured files is permitted. These improved approaches can thus impose security on files that are derived from secured files. In one embodiment, files that are deemed derived from a secured file include files that are copies of the secured file. In another embodiment, files that are deemed derived from a secured file include files having content substantially similar to the content of the secured file.

32 Claims, 11 Drawing Sheets

U.S. PATENT DOCUMENTS

| | | | |
|---|---|---|---|
| 5,301,247 A | 4/1994 | Rasmussen et al. | |
| 5,319,705 A | 6/1994 | Halter et al. | |
| 5,369,702 A | 11/1994 | Shanton | |
| 5,375,169 A | 12/1994 | Seheidt et al. | |
| 5,404,404 A | 4/1995 | Novorita | |
| 5,406,628 A | 4/1995 | Beller et al. | |
| 5,414,852 A | 5/1995 | Kramer et al. | |
| 5,418,965 A * | 5/1995 | Mahar | 711/170 |
| 5,437,012 A * | 7/1995 | Mahajan | 711/111 |
| 5,479,654 A * | 12/1995 | Squibb | 707/201 |
| 5,495,533 A * | 2/1996 | Linehan et al. | 713/155 |
| 5,499,297 A | 3/1996 | Boebert | |
| 5,502,766 A | 3/1996 | Boebert et al. | |
| 5,535,375 A | 7/1996 | Eshel et al. | |
| 5,557,765 A | 9/1996 | Lipner et al. | |
| 5,570,108 A | 10/1996 | McLaughlin et al. | |
| 5,584,023 A | 12/1996 | Hsu | |
| 5,600,722 A | 2/1997 | Yamaguchi et al. | |
| 5,606,663 A | 2/1997 | Kadooka | |
| 5,655,119 A * | 8/1997 | Davy | 707/200 |
| 5,661,806 A | 8/1997 | Nevoux et al. | |
| 5,671,412 A | 9/1997 | Christiano | |
| 5,673,316 A | 9/1997 | Auerbach et al. | |
| 5,677,953 A | 10/1997 | Dolphin | |
| 5,680,452 A | 10/1997 | Shanton | |
| 5,684,987 A | 11/1997 | Mamiya et al. | |
| 5,689,718 A | 11/1997 | Sakurai et al. | |
| 5,699,428 A | 12/1997 | McDonnal et al. | |
| 5,708,709 A | 1/1998 | Rose | |
| 5,715,403 A | 2/1998 | Stefik | |
| 5,717,755 A | 2/1998 | Shanton | |
| 5,720,033 A | 2/1998 | Deo | |
| 5,729,734 A | 3/1998 | Parker et al. | |
| 5,732,265 A * | 3/1998 | Dewitt et al. | 707/200 |
| 5,745,573 A | 4/1998 | Lipner et al. | |
| 5,748,736 A | 5/1998 | Mittra | |
| 5,751,287 A | 5/1998 | Hahn et al. | |
| 5,757,920 A | 5/1998 | Misra et al. | |
| 5,765,152 A | 6/1998 | Ericson | |
| 5,778,065 A | 7/1998 | Hauser et al. | |
| 5,787,169 A | 7/1998 | Eldridge et al. | |
| 5,787,173 A | 7/1998 | Seheidt et al. | |
| 5,787,175 A | 7/1998 | Carter | |
| 5,790,789 A | 8/1998 | Suarez | |
| 5,790,790 A | 8/1998 | Smith et al. | |
| 5,813,009 A | 9/1998 | Johnson et al. | |
| 5,821,933 A | 10/1998 | Keller et al. | |
| 5,825,876 A | 10/1998 | Peterson | |
| 5,835,592 A | 11/1998 | Chang et al. | |
| 5,835,601 A | 11/1998 | Shimbo et al. | |
| 5,857,189 A | 1/1999 | Riddle | |
| 5,862,325 A | 1/1999 | Reed et al. | |
| 5,870,468 A | 2/1999 | Harrison | |
| 5,870,477 A | 2/1999 | Sasaki et al. | |
| 5,881,287 A | 3/1999 | Mast | |
| 5,892,900 A | 4/1999 | Ginter et al. | |
| 5,893,084 A | 4/1999 | Morgan et al. | |
| 5,893,086 A * | 4/1999 | Schmuck et al. | 707/1 |
| 5,898,781 A | 4/1999 | Shanton | |
| 5,922,073 A | 7/1999 | Shimada | |
| 5,923,754 A | 7/1999 | Angelo et al. | |
| 5,933,498 A | 8/1999 | Schneck et al. | |
| 5,944,794 A | 8/1999 | Okamoto et al. | |
| 5,953,419 A | 9/1999 | Lohstroh et al. | |
| 5,956,729 A * | 9/1999 | Goetz et al. | 707/104.1 |
| 5,968,177 A | 10/1999 | Batten-Carew et al. | |
| 5,970,502 A | 10/1999 | Salkewicz et al. | |
| 5,987,440 A | 11/1999 | O'Neil et al. | |
| 5,991,879 A | 11/1999 | Still | |
| 5,999,907 A | 12/1999 | Donner | |
| 6,012,087 A * | 1/2000 | Freivald et al. | 709/218 |
| 6,014,730 A | 1/2000 | Ohtsu | |
| 6,023,506 A | 2/2000 | Ote et al. | |
| 6,032,216 A * | 2/2000 | Schmuck et al. | 710/200 |
| 6,038,322 A | 3/2000 | Harkins | |
| 6,044,155 A | 3/2000 | Thomlinson et al. | |
| 6,055,314 A | 4/2000 | Spies et al. | |
| 6,058,424 A | 5/2000 | Dixon et al. | |
| 6,061,790 A | 5/2000 | Bodnar | |
| 6,069,057 A | 5/2000 | Richards | |
| 6,085,323 A | 7/2000 | Shimizu et al. | |
| 6,088,717 A | 7/2000 | Reed et al. | |
| 6,088,805 A | 7/2000 | Davis et al. | |
| 6,098,056 A | 8/2000 | Rusnak et al. | |
| 6,101,507 A * | 8/2000 | Cane et al. | 707/204 |
| 6,105,131 A | 8/2000 | Carroll | |
| 6,122,630 A | 9/2000 | Strickler et al. | |
| 6,134,327 A | 10/2000 | Van Oorschot | |
| 6,134,658 A | 10/2000 | Multerer et al. | |
| 6,134,660 A | 10/2000 | Boneh et al. | |
| 6,134,664 A | 10/2000 | Walker | |
| 6,141,754 A | 10/2000 | Choy | |
| 6,145,084 A | 11/2000 | Zuili | |
| 6,158,010 A | 12/2000 | Moriconi et al. | |
| 6,161,139 A | 12/2000 | Win et al. | |
| 6,182,142 B1 | 1/2001 | Win et al. | |
| 6,185,684 B1 | 2/2001 | Pravetz et al. | |
| 6,192,408 B1 | 2/2001 | Vahalia et al. | |
| 6,205,549 B1 | 3/2001 | Pravetz et al. | |
| 6,212,561 B1 | 4/2001 | Sitaraman et al. | |
| 6,223,285 B1 | 4/2001 | Komuro et al. | |
| 6,226,618 B1 | 5/2001 | Downs et al. | |
| 6,226,745 B1 | 5/2001 | Wiederhold et al. | |
| 6,240,188 B1 | 5/2001 | Dondeti et al. | |
| 6,249,873 B1 | 6/2001 | Richard et al. | |
| 6,253,193 B1 | 6/2001 | Ginter et al. | |
| 6,260,040 B1 | 7/2001 | Kauffman et al. | |
| 6,260,141 B1 | 7/2001 | Park | |
| 6,263,348 B1 * | 7/2001 | Kathrow et al. | 707/203 |
| 6,272,631 B1 | 8/2001 | Thomlinson et al. | |
| 6,272,632 B1 | 8/2001 | Carman et al. | |
| 6,282,649 B1 | 8/2001 | Lambert et al. | |
| 6,289,450 B1 | 9/2001 | Pensak et al. | |
| 6,292,895 B1 | 9/2001 | Baltzley | |
| 6,292,899 B1 | 9/2001 | McBride | |
| 6,295,361 B1 | 9/2001 | Kadansky et al. | |
| 6,301,614 B1 | 10/2001 | Najork et al. | |
| 6,308,256 B1 | 10/2001 | Folmsbee | |
| 6,308,273 B1 | 10/2001 | Goertzel et al. | |
| 6,314,409 B2 | 11/2001 | Schneck et al. | |
| 6,317,777 B1 | 11/2001 | Skarbo et al. | |
| 6,332,025 B2 | 12/2001 | Takahashi et al. | |
| 6,336,114 B1 | 1/2002 | Garrison | |
| 6,339,423 B1 | 1/2002 | Sampson et al. | |
| 6,339,825 B2 | 1/2002 | Pensak et al. | |
| 6,341,164 B1 | 1/2002 | Dilkie et al. | |
| 6,343,316 B1 | 1/2002 | Sakata | |
| 6,347,374 B1 | 2/2002 | Drake et al. | |
| 6,349,337 B1 | 2/2002 | Parsons et al. | |
| 6,351,813 B1 | 2/2002 | Mooney et al. | |
| 6,356,903 B1 | 3/2002 | Baxter et al. | |
| 6,356,941 B1 | 3/2002 | Cohen | |
| 6,357,010 B1 | 3/2002 | Viets et al. | |
| 6,363,480 B1 | 3/2002 | Perlman | |
| 6,366,930 B1 * | 4/2002 | Parker et al. | 707/203 |
| 6,370,249 B1 | 4/2002 | Van Oorschot | |
| 6,381,698 B1 | 4/2002 | Devanbu et al. | |
| 6,389,433 B1 * | 5/2002 | Bolosky et al. | 707/205 |
| 6,389,538 B1 | 5/2002 | Gruse et al. | |
| 6,393,420 B1 * | 5/2002 | Peters | 707/9 |
| 6,393,438 B1 * | 5/2002 | Kathrow et al. | 707/203 |
| 6,405,315 B1 | 6/2002 | Burns et al. | |
| 6,421,714 B1 | 7/2002 | Rai et al. | |
| 6,442,688 B1 | 8/2002 | Moses et al. | |

| Patent | Date | Inventor |
|---|---|---|
| 6,442,695 B1 | 8/2002 | Dutcher et al. |
| 6,446,090 B1 | 9/2002 | Hart |
| 6,449,721 B1 | 9/2002 | Pensak et al. |
| 6,453,353 B1 | 9/2002 | Win et al. |
| 6,466,932 B1 | 10/2002 | Dennis et al. |
| 6,477,544 B1 * | 11/2002 | Bolosky et al. ............ 707/200 |
| 6,490,680 B1 | 12/2002 | Scheidt et al. |
| 6,505,300 B2 | 1/2003 | Chan et al. |
| 6,510,349 B1 | 1/2003 | Schnek et al. |
| 6,519,700 B1 | 2/2003 | Ram et al. |
| 6,529,956 B1 | 3/2003 | Smith et al. |
| 6,530,020 B1 | 3/2003 | Aoki |
| 6,530,024 B1 | 3/2003 | Proctor |
| 6,542,608 B2 | 4/2003 | Scheidt et al. |
| 6,549,623 B1 | 4/2003 | Scheidt et al. |
| 6,550,011 B1 | 4/2003 | Sims |
| 6,557,039 B1 | 4/2003 | Leong et al. |
| 6,567,914 B1 | 5/2003 | Just et al. |
| 6,571,291 B1 | 5/2003 | Chow |
| 6,574,657 B1 * | 6/2003 | Dickinson .................. 709/203 |
| 6,584,466 B1 | 6/2003 | Serbinis et al. |
| 6,587,946 B1 | 7/2003 | Jakobsson |
| 6,588,673 B1 | 7/2003 | Chan et al. |
| 6,594,662 B1 | 7/2003 | Sieffert et al. |
| 6,598,161 B1 | 7/2003 | Kluttz et al. |
| 6,603,857 B1 | 8/2003 | Batten-Carew et al. |
| 6,608,636 B1 | 8/2003 | Roseman |
| 6,611,599 B2 | 8/2003 | Natarajan |
| 6,611,846 B1 | 8/2003 | Stoodley |
| 6,615,349 B1 | 9/2003 | Hair |
| 6,615,350 B1 | 9/2003 | Schell et al. |
| 6,625,650 B2 | 9/2003 | Stelliga |
| 6,629,243 B1 | 9/2003 | Kleinman et al. |
| 6,633,311 B1 | 10/2003 | Douvikas et al. |
| 6,640,307 B2 | 10/2003 | Viets et al. |
| 6,646,515 B2 | 11/2003 | Jun et al. |
| 6,647,388 B2 | 11/2003 | Numao et al. |
| 6,678,835 B1 | 1/2004 | Shah et al. |
| 6,687,822 B1 | 2/2004 | Jakobsson |
| 6,711,683 B1 | 3/2004 | Laczko et al. |
| 6,718,361 B1 | 4/2004 | Basani et al. |
| 6,735,701 B1 | 5/2004 | Jacobson |
| 6,738,908 B1 | 5/2004 | Bonn et al. |
| 6,775,779 B1 | 8/2004 | England et al. |
| 6,782,403 B1 | 8/2004 | Kino et al. |
| 6,801,999 B1 | 10/2004 | Venkatesan et al. |
| 6,807,534 B1 | 10/2004 | Erickson |
| 6,807,636 B2 | 10/2004 | Hartman et al. |
| 6,810,389 B1 | 10/2004 | Meyer |
| 6,810,479 B1 | 10/2004 | Barlow et al. |
| 6,816,871 B2 | 11/2004 | Lee |
| 6,816,872 B1 * | 11/2004 | Squibb ........................ 707/200 |
| 6,826,698 B1 | 11/2004 | Minkin et al. |
| 6,834,333 B2 | 12/2004 | Yoshino et al. |
| 6,834,341 B1 | 12/2004 | Bahl et al. |
| 6,845,452 B1 | 1/2005 | Roddy et al. |
| 6,851,050 B2 | 2/2005 | Singhal et al. |
| 6,865,555 B1 | 3/2005 | Novak |
| 6,874,139 B2 * | 3/2005 | Krueger et al. .............. 717/127 |
| 6,877,136 B2 | 4/2005 | Bess et al. |
| 6,889,210 B1 | 5/2005 | Vainstein |
| 6,891,953 B1 | 5/2005 | DeMello et al. |
| 6,892,201 B2 | 5/2005 | Brown et al. |
| 6,892,306 B1 | 5/2005 | En-Seung et al. |
| 6,907,034 B1 | 6/2005 | Begis |
| 6,909,708 B1 | 6/2005 | Krishnaswamy et al. |
| 6,915,434 B1 | 7/2005 | Kuroda et al. |
| 6,920,558 B2 | 7/2005 | Sames et al. |
| 6,931,450 B2 | 8/2005 | Howard et al. |
| 6,931,530 B2 | 8/2005 | Pham et al. |
| 6,931,597 B1 | 8/2005 | Prakash |
| 6,938,042 B2 | 8/2005 | Aboulhosn et al. |
| 6,941,355 B1 | 9/2005 | Donaghey et al. |
| 6,941,456 B2 | 9/2005 | Wilson |
| 6,941,472 B2 | 9/2005 | Moriconi et al. |
| 6,944,183 B1 | 9/2005 | Iyer et al. |
| 6,947,556 B1 * | 9/2005 | Matyas et al. ................ 380/29 |
| 6,950,818 B2 | 9/2005 | Dennis et al. |
| 6,950,936 B2 | 9/2005 | Subramaniam et al. |
| 6,950,941 B1 | 9/2005 | Lee et al. |
| 6,950,943 B1 | 9/2005 | Bacha et al. |
| 6,952,780 B2 | 10/2005 | Olsen et al. |
| 6,957,261 B2 | 10/2005 | Lortz |
| 6,959,308 B2 | 10/2005 | Gramsamer et al. |
| 6,961,849 B1 | 11/2005 | Davis et al. |
| 6,968,060 B1 | 11/2005 | Pinkas |
| 6,971,018 B1 * | 11/2005 | Witt et al. ................... 713/187 |
| 6,978,376 B2 | 12/2005 | Giroux et al. |
| 6,978,377 B1 | 12/2005 | Asano et al. |
| 6,988,133 B1 | 1/2006 | Zavalkovsky et al. |
| 6,988,199 B2 | 1/2006 | Toh et al. |
| 6,993,135 B2 | 1/2006 | Ishibashi |
| 6,996,718 B1 | 2/2006 | Henry et al. |
| 7,003,117 B2 | 2/2006 | Kacker et al. |
| 7,003,560 B1 | 2/2006 | Mullen et al. |
| 7,003,661 B2 | 2/2006 | Beattie et al. |
| 7,013,332 B2 | 3/2006 | Friedel et al. |
| 7,013,485 B2 | 3/2006 | Brown et al. |
| 7,020,645 B2 | 3/2006 | Bisbee et al. |
| 7,024,427 B2 | 4/2006 | Bobbitt et al. |
| 7,035,854 B2 | 4/2006 | Hsiao et al. |
| 7,035,910 B1 | 4/2006 | Dutta et al. |
| 7,043,637 B2 * | 5/2006 | Bolosky et al. ............. 713/171 |
| 7,046,807 B2 | 5/2006 | Hirano et al. |
| 7,051,213 B1 | 5/2006 | Kobayashi et al. |
| 7,055,175 B1 * | 5/2006 | Le Pennec et al. ............ 726/24 |
| 7,058,696 B1 * | 6/2006 | Phillips et al. .............. 709/217 |
| 7,058,978 B2 | 6/2006 | Feuerstein et al. |
| 7,073,063 B2 | 7/2006 | Peinado |
| 7,073,073 B1 | 7/2006 | Nonaka et al. |
| 7,076,067 B2 | 7/2006 | Raike et al. |
| 7,076,312 B2 | 7/2006 | Law et al. |
| 7,076,469 B2 | 7/2006 | Schreiber et al. |
| 7,076,633 B2 | 7/2006 | Tormasov et al. |
| 7,080,077 B2 | 7/2006 | Ramamurthy et al. |
| 7,095,853 B2 | 8/2006 | Takuya |
| 7,096,266 B2 | 8/2006 | Lewin et al. |
| 7,099,926 B1 | 8/2006 | Ims et al. |
| 7,107,269 B2 | 9/2006 | Arlein et al. |
| 7,107,416 B2 | 9/2006 | Stuart et al. |
| 7,117,322 B2 | 10/2006 | Hochberg et al. |
| 7,120,635 B2 | 10/2006 | Bhide et al. |
| 7,120,757 B2 | 10/2006 | Tsuge |
| 7,124,164 B1 | 10/2006 | Chemtob |
| 7,130,964 B2 | 10/2006 | Ims et al. |
| 7,131,071 B2 | 10/2006 | Gune et al. |
| 7,134,041 B2 * | 11/2006 | Murray et al. ................. 714/4 |
| 7,136,903 B1 | 11/2006 | Phillips et al. |
| 7,145,898 B1 | 12/2006 | Elliott |
| 7,146,388 B2 | 12/2006 | Stakutis et al. |
| 7,146,498 B1 | 12/2006 | Takechi et al. |
| 7,159,036 B2 | 1/2007 | Hinchliffe et al. |
| 7,171,557 B2 | 1/2007 | Kallahalla et al. |
| 7,174,563 B1 | 2/2007 | Brownlie et al. |
| 7,177,427 B1 | 2/2007 | Komuro et al. |
| 7,178,033 B1 | 2/2007 | Garcia |
| 7,181,017 B1 | 2/2007 | Nagel et al. |
| 7,185,364 B2 | 2/2007 | Knouse et al. |
| 7,187,033 B2 | 3/2007 | Pendharkar |
| 7,188,181 B1 | 3/2007 | Squier et al. |
| 7,194,764 B2 | 3/2007 | Martherus et al. |
| 7,200,747 B2 | 4/2007 | Riedel et al. |
| 7,203,317 B2 | 4/2007 | Kallahalla et al. |
| 7,203,968 B2 | 4/2007 | Asano et al. |
| 7,219,230 B2 | 5/2007 | Riedel et al. |
| 7,224,795 B2 | 5/2007 | Takada et al. |

| | | |
|---|---|---|
| 7,225,256 B2 | 5/2007 | Villavicencio |
| 7,227,953 B2 | 6/2007 | Shida |
| 7,233,948 B1 | 6/2007 | Shamoon et al. |
| 7,237,002 B1 | 6/2007 | Estrada et al. |
| 7,249,044 B2 | 7/2007 | Kumar et al. |
| 7,260,555 B2 * | 8/2007 | Rossmann et al. ............ 705/51 |
| 7,265,764 B2 | 9/2007 | Alben et al. |
| 7,266,684 B2 | 9/2007 | Jancula |
| 7,280,658 B2 | 10/2007 | Amini et al. |
| 7,287,055 B2 | 10/2007 | Smith et al. |
| 7,290,148 B2 | 10/2007 | Tozawa et al. |
| 7,308,702 B1 | 12/2007 | Thomsen et al. |
| 7,313,824 B1 | 12/2007 | Bala et al. |
| 7,319,752 B2 | 1/2008 | Asano et al. |
| 7,340,600 B1 | 3/2008 | Corella |
| 7,380,120 B1 | 5/2008 | Garcia |
| 7,383,586 B2 | 6/2008 | Cross et al. |
| 7,386,529 B2 | 6/2008 | Kiessig et al. |
| 7,401,220 B2 * | 7/2008 | Bolosky et al. ............ 713/165 |
| 7,415,608 B2 * | 8/2008 | Bolosky et al. ............ 713/165 |
| 7,454,612 B2 * | 11/2008 | Bolosky et al. ............ 713/165 |
| 7,478,243 B2 * | 1/2009 | Bolosky et al. ............ 713/181 |
| 7,539,867 B2 * | 5/2009 | Bolosky et al. ............ 713/175 |
| 2001/0011254 A1 | 8/2001 | Clark |
| 2001/0021926 A1 | 9/2001 | Schneck et al. |
| 2001/0032181 A1 | 10/2001 | Jakstadt et al. |
| 2001/0034839 A1 | 10/2001 | Karjoth et al. |
| 2001/0044903 A1 | 11/2001 | Yamamoto et al. |
| 2001/0056550 A1 | 12/2001 | Lee |
| 2002/0010679 A1 | 1/2002 | Felsher |
| 2002/0016922 A1 | 2/2002 | Richards et al. |
| 2002/0031230 A1 | 3/2002 | Sweet et al. |
| 2002/0035624 A1 | 3/2002 | Kim |
| 2002/0046350 A1 | 4/2002 | Lordemann et al. |
| 2002/0050098 A1 | 5/2002 | Chan |
| 2002/0056042 A1 | 5/2002 | Van Der Kaay et al. |
| 2002/0062240 A1 | 5/2002 | Morinville |
| 2002/0062245 A1 | 5/2002 | Niu et al. |
| 2002/0069077 A1 | 6/2002 | Brophy et al. |
| 2002/0069272 A1 | 6/2002 | Kim et al. |
| 2002/0069363 A1 | 6/2002 | Winburn |
| 2002/0073320 A1 | 6/2002 | Rinkevich et al. |
| 2002/0077986 A1 | 6/2002 | Kobata et al. |
| 2002/0077988 A1 | 6/2002 | Sasaki et al. |
| 2002/0078239 A1 * | 6/2002 | Howard et al. ............ 709/245 |
| 2002/0087479 A1 | 7/2002 | Malcolm |
| 2002/0099947 A1 | 7/2002 | Evans |
| 2002/0124180 A1 | 9/2002 | Hagman |
| 2002/0129235 A1 | 9/2002 | Okamoto et al. |
| 2002/0133699 A1 | 9/2002 | Pueschel |
| 2002/0138762 A1 | 9/2002 | Horne |
| 2002/0143710 A1 | 10/2002 | Liu |
| 2002/0143906 A1 | 10/2002 | Tormasov et al. |
| 2002/0156726 A1 | 10/2002 | Kleckner et al. |
| 2002/0157016 A1 | 10/2002 | Russell et al. |
| 2002/0169963 A1 | 11/2002 | Seder et al. |
| 2002/0169965 A1 | 11/2002 | Hale et al. |
| 2002/0172367 A1 | 11/2002 | Mulder et al. |
| 2002/0174109 A1 | 11/2002 | Chandy et al. |
| 2002/0176572 A1 | 11/2002 | Ananth |
| 2002/0178271 A1 | 11/2002 | Graham et al. |
| 2002/0194484 A1 * | 12/2002 | Bolosky et al. ............ 713/189 |
| 2002/0198798 A1 | 12/2002 | Ludwig et al. |
| 2003/0009685 A1 | 1/2003 | Choo et al. |
| 2003/0014391 A1 | 1/2003 | Evans et al. |
| 2003/0023559 A1 | 1/2003 | Choi et al. |
| 2003/0028610 A1 | 2/2003 | Pearson |
| 2003/0033528 A1 | 2/2003 | Ozog et al. |
| 2003/0037133 A1 | 2/2003 | Owens |
| 2003/0037237 A1 | 2/2003 | Abgrall et al. |
| 2003/0037253 A1 | 2/2003 | Blank et al. |
| 2003/0046238 A1 | 3/2003 | Nonaka et al. |
| 2003/0051039 A1 | 3/2003 | Brown et al. |
| 2003/0056139 A1 * | 3/2003 | Murray et al. ............ 714/4 |
| 2003/0074580 A1 | 4/2003 | Knouse et al. |
| 2003/0078959 A1 | 4/2003 | Yeung et al. |
| 2003/0079175 A1 | 4/2003 | Limantsev |
| 2003/0081784 A1 | 5/2003 | Kallahalla et al. |
| 2003/0081787 A1 | 5/2003 | Kallahalla et al. |
| 2003/0088517 A1 | 5/2003 | Medoff |
| 2003/0088783 A1 * | 5/2003 | DiPierro ............ 713/189 |
| 2003/0101072 A1 | 5/2003 | Dick et al. |
| 2003/0110169 A1 | 6/2003 | Zuili |
| 2003/0110266 A1 | 6/2003 | Rollins et al. |
| 2003/0110397 A1 | 6/2003 | Supramaniam |
| 2003/0115146 A1 | 6/2003 | Lee et al. |
| 2003/0115570 A1 | 6/2003 | Bisceglia |
| 2003/0120601 A1 | 6/2003 | Ouye |
| 2003/0120684 A1 | 6/2003 | Zuili et al. |
| 2003/0126434 A1 | 7/2003 | Lim et al. |
| 2003/0140049 A1 * | 7/2003 | Radatti ............ 707/100 |
| 2003/0154381 A1 | 8/2003 | Ouye |
| 2003/0159066 A1 | 8/2003 | Staw et al. |
| 2003/0172280 A1 | 9/2003 | Scheidt et al. |
| 2003/0177070 A1 | 9/2003 | Viswanath et al. |
| 2003/0177378 A1 | 9/2003 | Wittkotter |
| 2003/0182579 A1 | 9/2003 | Leporini et al. |
| 2003/0197729 A1 | 10/2003 | Denoue et al. |
| 2003/0200202 A1 | 10/2003 | Hsiao et al. |
| 2003/0217264 A1 | 11/2003 | Martin et al. |
| 2003/0217281 A1 | 11/2003 | Ryan |
| 2003/0217333 A1 | 11/2003 | Smith et al. |
| 2003/0226013 A1 | 12/2003 | Dutertre |
| 2003/0233650 A1 | 12/2003 | Zaner et al. |
| 2004/0022390 A1 | 2/2004 | McDonald et al. |
| 2004/0025037 A1 | 2/2004 | Hair |
| 2004/0039781 A1 | 2/2004 | LaVallee et al. |
| 2004/0064710 A1 | 4/2004 | Vainstein |
| 2004/0068524 A1 | 4/2004 | Aboulhosn et al. |
| 2004/0068664 A1 | 4/2004 | Nachenberg et al. |
| 2004/0073660 A1 | 4/2004 | Toomey |
| 2004/0073718 A1 | 4/2004 | Johannessen et al. |
| 2004/0088548 A1 | 5/2004 | Smetters et al. |
| 2004/0098580 A1 | 5/2004 | DeTreville |
| 2004/0103202 A1 | 5/2004 | Hildebrand et al. |
| 2004/0103280 A1 | 5/2004 | Balfanz et al. |
| 2004/0133544 A1 | 7/2004 | Kiessig et al. |
| 2004/0158586 A1 | 8/2004 | Tsai |
| 2004/0193602 A1 | 9/2004 | Liu et al. |
| 2004/0193905 A1 | 9/2004 | Lirov et al. |
| 2004/0193912 A1 | 9/2004 | Li et al. |
| 2004/0199514 A1 | 10/2004 | Rosenblatt et al. |
| 2004/0215956 A1 | 10/2004 | Venkatachary et al. |
| 2004/0215962 A1 * | 10/2004 | Douceur et al. ............ 713/167 |
| 2004/0243853 A1 | 12/2004 | Swander et al. |
| 2005/0021467 A1 | 1/2005 | Franzdonk |
| 2005/0021629 A1 | 1/2005 | Cannata et al. |
| 2005/0028006 A1 | 2/2005 | Leser et al. |
| 2005/0039034 A1 | 2/2005 | Doyle et al. |
| 2005/0071275 A1 | 3/2005 | Vainstein et al. |
| 2005/0071657 A1 | 3/2005 | Ryan |
| 2005/0071658 A1 | 3/2005 | Nath et al. |
| 2005/0081029 A1 | 4/2005 | Thornton et al. |
| 2005/0086531 A1 | 4/2005 | Kenrich |
| 2005/0091484 A1 | 4/2005 | Thornton et al. |
| 2005/0120199 A1 | 6/2005 | Carter |
| 2005/0138371 A1 | 6/2005 | Supramaniam |
| 2005/0138383 A1 | 6/2005 | Vainstein |
| 2005/0177716 A1 | 8/2005 | Ginter et al. |
| 2005/0177858 A1 | 8/2005 | Ueda |
| 2005/0198326 A1 | 9/2005 | Schlimmer et al. |
| 2005/0223242 A1 | 10/2005 | Nath |
| 2005/0223414 A1 | 10/2005 | Kenrich et al. |
| 2005/0235154 A1 | 10/2005 | Serret-Avila |
| 2005/0256909 A1 | 11/2005 | Aboulhosn et al. |
| 2005/0273600 A1 | 12/2005 | Seeman |

| | | | |
|---|---|---|---|
| 2005/0283610 | A1 | 12/2005 | Serret-Avila et al. |
| 2005/0288961 | A1 | 12/2005 | Tabrizi |
| 2006/0005021 | A1 | 1/2006 | Torrubia-Saez |
| 2006/0075465 | A1 | 4/2006 | Ramanathan et al. |
| 2006/0093150 | A1 | 5/2006 | Reddy et al. |
| 2006/0168147 | A1 | 7/2006 | Inoue et al. |
| 2006/0230437 | A1 | 10/2006 | Boyer et al. |
| 2007/0006214 | A1 | 1/2007 | Dubal et al. |
| 2007/0067837 | A1 | 3/2007 | Schuster |

FOREIGN PATENT DOCUMENTS

| | | |
|---|---|---|
| EP | 0 674 253 A1 | 9/1995 |
| EP | 0 809 170 A1 | 11/1997 |
| EP | 0 913 966 A2 | 5/1999 |
| EP | 0 913 967 A2 | 5/1999 |
| EP | 0 950 941 A2 | 10/1999 |
| EP | 0 950 941 A3 | 10/1999 |
| EP | 1 107 504 B1 | 6/2001 |
| EP | 1 107504 A2 | 6/2001 |
| EP | 1 130 492 A2 | 9/2001 |
| EP | 1 154 348 A2 | 11/2001 |
| EP | 1324565 A1 | 7/2003 |
| GB | 2 328 047 A | 2/1999 |
| JP | 2001-036517 | 2/2001 |
| WO | WO 96/41288 A1 | 12/1996 |
| WO | WO 00/56028 A2 | 9/2000 |
| WO | WO 01/61438 A2 | 8/2001 |
| WO | WO 01/63387 A2 | 8/2001 |
| WO | WO 01/63387 A3 | 8/2001 |
| WO | WO 01/77783 A2 | 10/2001 |
| WO | WO 01/78285 A1 | 10/2001 |
| WO | WO 01/84271 A2 | 11/2001 |

OTHER PUBLICATIONS

"Inside Encrypting File System," Part 2, from MSDN Oct. 2001 version, exact publication date is unknown but believed prior to Dec. 12, 2001.

"Security with Encrypting File System," from MSDN Oct. 2001 version, exact publication date is unknown but believed prior to Dec. 12, 2001.

"How EFS Works," from MSDN Oct. 2001 version, exact publication date is unknown but believed prior to Dec. 12, 2001.

"Encrypting File System," from MSDN Oct. 2001 version, exact publication date is unknown but believed prior to Dec. 12, 2001.

"Features of EFS," from MSDN Oct. 2001 version, exact publication date is unknown but believed prior to Dec. 12, 2001.

"Windows 2000 EFS," in the Apr. 1999 issue of *Windows NT Magazine*.

Expiration Mechanism for Chipcards, IBM Technical Disclosure Bulletin, Oct. 1, 2001, UK.

McDaniel et al. "Antigone: A Flexible Framework for Secure Group Communication," Proceedings of the 8th USENIX Security Symposium, Aug. 23, 1999.

Stallings, William, "Cryptography and Network Security: Principles and Practice," 1999, pp. 333-337, Second Edition, Prentice Hall, Upper Saddle River, New Jersey.

"Affect," The American Heritage Dictionary of the English Language, Fourth Edition, Houghton Mifflin Company, 2002. Retrieved May 4, 2006 from http://dictionary.reference.com/search?q=affect.

Microsoft Windows 200 server. Windows 2000 Group Policy White Paper, 2000.

Symantec. Norton Antivirus Corporate Edition Implementation Guide, 1999.

Crocker, Steven Toye, "Multi-level cryptographic transformations for securing digital assets,"U.S. Appl. No. 10/404,566, filed Mar. 31, 2003.

Crocker, Steven Toye, "Effectuating access policy changes to designated places for secured files," U.S. Appl. No. 10/259,075, filed Sep. 27, 2002.

Kenrich, Michael Frederick, "Multi-Level File Digest", U.S. Appl. No. 10/894,493, filed Jul. 19, 2004.

Kinghorn, Gary Mark, "Method and system for protecting electronic data in enterprise environment, "U.S. Appl. No. 10/159,220, filed May 31, 2002.

Nath, Satyajit, "Method and system for securing digital assets using content type designations," U.S. Appl. No. 10/405,587, filed Apr. 1, 2003.

Prakash, Nalini J., "Method and apparatus for securing/unsecuring files by file crawling," U.S. Appl. No. 10/325,102, filed Dec. 20, 2002.

Rossmann, Alain, "Hybrid systems for securing digital assets," U.S. Appl. No. 10/325,013, filed Dec. 20, 2002.

A Real-Time Push-Pull Communications Model for Distributed Real-Time and Multimedia Systems, Jan. 1999, School of Computer Sciences Carnegie Mellon University, Kanaka Juvva, Raj Rajkumar.

U.S. Appl. No. 10/889,685, entitled "Method and Apparatus for Controlling the Speed Ranges of a Machine" inventor Thomas, Jul. 13, 2004, 18 pgs.

U.S. Appl. No. 10/028,397, entitled "Method and system for restricting use of a clipboard application, " inventor Zuili, Dec. 21, 2001, 38 pgs.

U.S. Appl. No. 10/368,277, entitled "Method and apparatus for uniquely identifying files," inventor Ouye, Feb. 18, 2003, 25 pgs.

U.S. Appl. No. 10/327,320, entitled "Security system with staging capabilities " inventor Vainstein, Dec. 20, 2002, 39 pgs.

U.S. Appl. No. 10/286,524, entitled "Security system that uses indirect password-based encryption," inventor Gutnik, Nov. 1, 2002, 38 pgs.

U.S. Appl. No. 10/242,185, entitled "Method and system for protecting encrypted files transmitted over a network" inventor Ryan, Sep. 11, 2002, 33 pgs.

U.S. Appl. No. 10/642,041, entitled "Method and system for fault-tolerant transfer of files across a network" inventor Kenrich, Aug. 15, 2003, 32 pgs.

U.S. Appl. No. 10/610,832, entitled "Method and system for enabling users of a group shared across multiple file security systems to access secured files " inventor Ryan, Jun. 30, 2003, 33 pgs.

U.S. Appl. No. 10/448,806, entitled "Method and System for Using Remote Headers to Secure Electronic Files " inventor Ryan, May 30, 2003, 35 pgs.

U.S. Appl. No. 10/074,194, entitled "Methods for idnetifying compunds that inhibit or reduce PTP1B expressions" inventor Rondinone, Feb. 12, 2002, 69 pgs.

U.S. Appl. No. 10/074,804, entitled "Secured Data Format for Access Control," inventor Garcia, Feb. 12, 2002, 108 pgs.

U.S. Appl. No. 10/075,194, entitled "System and Method for Providing Multi-location Access Management to Secured Items," inventor Vainstein et al., Feb. 12, 2002, 110 pgs.

U.S. Appl. No. 10/074,996, entitled "Method and Apparatus for Securing Electronic Data," inventor Lee et al., Feb. 12, 2002, 111 pgs.

U.S. Appl. No. 10/074,825, entitled "Method and Apparatus for Accessing Secured Electronic Data Off-line," inventor Lee et al., Feb. 12, 2002, 108 pgs.

U.S. Appl. No. 10/105,532, entitled "System and Method for Providing Different Levels of Key Security for Controlling Access to Secured Items," inventor Hildebrand et al., Mar. 20, 2002, 86 pgs.

U.S. Appl. No. 10/186,203, entitled "Method and System for Implementing Changes to Security Policies in a Distributed Security System," inventor Huang, Jun. 26, 2002, 65 pgs.

U.S. Appl. No. 10/201,756, entitled "Managing Secured Files in Designated Locations," inventor Alain, Jul. 22, 2002, 121 pgs.

U.S. Appl. No. 10/206,737, entitled "Method and System for Updating Keys in a Distributed Security System," inventor Hildebrand, Jul. 26, 2002, 60 pgs.

U.S. Appl. No. 10/246,079, entitled "Security System for Generating Keys from Access rules in a Decentralized Manner and Methods Therefor," inventor Hildebrand, Sep. 17, 2002, 78 pgs.

U.S. Appl. No. 10/259,075, entitled "Effectuating Access Policy Changes to Designated Places for Secured Files," inventor Crocker, Sep. 27, 2002, 60 pgs.

U.S. Appl. No. 10/286,575, entitled "Method and Architecture for Providing Access to Secured Data from Non-Secured Clients," inventor Vainstein, Nov. 1, 2002, 46 pgs.

U.S. Appl. No. 10/295,363, entitled "Security System Using Indirect Key Generation from Access Rules and Methods Therefor," inventor Vainstein, Nov. 15, 2002, 70 pgs.

U.S. Appl. No. 11/889,310, entitled "Methods and Systems for Providing Access Control to Electronic Data," inventor Rossmann, Aug. 10, 2007, 90 pgs.

U.S. Appl. No. 11/797,367, entitled "Method and System for Managing Security Tiers," inventor Vainstein, May 2, 2007, 11 pgs.

Adobe Acrobat 5.0 Classroom in a Book, Adobe Press, Jun. 26, 2001, pp. 1-4.

Adobe Acrobat Security Settings, Acrobat 7.0, Nov. 15, 2004, pp. 1-4.

"Security Options". Dec. 20, 2001. DC & Co. pp. 1-2.

Microsoft Press Computer Dictionary, 1997, Microsoft Press, Third Edition, p. 426.

Search Report, completion date May 8, 2003, for European Patent Application No. EP 02 25 8530, 2 pages.

Search Report, completion date Oct. 2, 2003, for European Patent Application No. EP 02 25 8531, 2 pages.

Search Report, completion date Apr. 14, 2005, for European Patent Application No. EP 02 25 8533, 2 pages.

Search Report, completion date Mar. 16, 2005, for European Patent Application No. EP 02 25 8534, 2 pages.

Search Report, completion date Mar. 2, 2005, for European Patent Application No. EP 02 25 8535, 2 pages.

Search Report, completion date Mar. 3, 2005, for European Patent Application No. EP 02 25 8537, 2 pages.

Search Report, completion date May 12, 2005, for European Patent Application No. EP 02 25 8539, 2 pages.

Search Report, completion date Jul. 6, 2005, for European Patent Application No. EP 02 25 8529, 4 pages.

Search Report, completion date Oct. 8, 2003, for European Patent Application No. EP 02 25 8536, 2 pages.

Search Report, completion date May 8, 2003, for European Patent Application No. EP 02 25 8540, 2 pages.

Examination Report, completion date Jun. 18, 2008, for European Patent Application No. EP 02 258 532.7-1244, 6 pgs.

Office Action, dated May 10, 2005, for European Patent Application No. 02258532.7, 5 pgs.

Office Action, dated Dec. 5, 2006, for European Patent Application No. 02258532.7, 5 pgs.

Boneh et al., "Hierarchical Identity Based Encryption with Constant Size Ciphertext," Advances in Cryptology- EUROCRYPT 2005, vol. 3493, Jun. 20, 2005, pp. 440-456.

Boneh et al., "IBE Secure E-mail," Stanford University, Apr. 8, 2002, http://crypto.stanford.edu/ibe/.

* cited by examiner

SYSTEM AND METHOD FOR IMPOSING SECURITY ON COPIES OF SECURED ITEMS

CROSS-REFERENCE TO RELATED APPLICATIONS

This application is related to U.S. patent application Ser. No. 10/075,194, filed Feb. 12, 2002, and entitled "SYSTEM AND METHOD FOR PROVIDING MULTI-LOCATION ACCESS MANAGEMENT TO SECURED ITEMS," which is hereby incorporated by reference for all purposes.

BACKGROUND OF THE INVENTION

1. Field of the Invention

The present invention relates to security systems for data and, more particularly, to security systems that protect data in an inter/intra enterprise environment.

2. Description of Related Art

The Internet is the fastest growing telecommunications medium in history. This growth and the easy access it affords have significantly enhanced the opportunity to use advanced information technology for both the public and private sectors. It provides unprecedented opportunities for interaction and data sharing among businesses and individuals. However, the advantages provided by the Internet come with a significantly greater element of risk to the confidentiality and integrity of information. The Internet is a widely open, public and international network of interconnected computers and electronic devices. Without proper security means, an unauthorized person or machine may intercept any information traveling across the Internet and even get access to proprietary information stored in computers that interconnect to the Internet, but are otherwise generally inaccessible by the public.

There are many efforts in progress aimed at protecting proprietary information traveling across the Internet and controlling access to computers carrying the proprietary information. Cryptography allows people to carry over the confidence found in the physical world to the electronic world, thus allowing people to do business electronically without worries of deceit and deception. Every day hundreds of thousands of people interact electronically, whether it is through e-mail, e-commerce (business conducted over the Internet), ATM machines, or cellular phones. The perpetual increase of information transmitted electronically has lead to an increased reliance on cryptography.

One of the ongoing efforts in protecting the proprietary information traveling across the Internet is to use one or more cryptographic techniques to secure a private communication session between two communicating computers on the Internet. The cryptographic techniques provide a way to transmit information across an unsecure communication channel without disclosing the contents of the information to anyone eavesdropping on the communication channel. Using an encryption process in a cryptographic technique, one party can protect the contents of the data in transit from access by an unauthorized third party, yet the intended party can read the data using a corresponding decryption process.

A firewall is another security measure that protects the resources of a private network from users of other networks. However, it has been reported that many unauthorized accesses to proprietary information occur from the inside, as opposed to from the outside. An example of someone gaining unauthorized access from the inside is when restricted or proprietary information is accessed by someone within an organization who is not supposed to do so. Due to the open nature of the Internet, contractual information, customer data, executive communications, product specifications, and a host of other confidential and proprietary intellectual property remain available and vulnerable to improper access and usage by unauthorized users within or outside a supposedly protected perimeter.

Many businesses and organizations have been looking for effective ways to protect their proprietary information. Typically, businesses and organizations have deployed firewalls, Virtual Private Networks (VPNs), and Intrusion Detection Systems (IDS) to provide protection. Unfortunately, these various security means have been proven insufficient to reliably protect proprietary information residing on private networks. For example, depending on passwords to access sensitive documents from within often causes security breaches when the password of a few characters long is leaked or detected.

Besides the difficulty in protecting resources on networks, security systems have transparently imposed security on documents while also permitting authorized parties to utilize the files as if there were no security. Once an authorized party gains access to a secured resource, the resource is unsecured and presented to the authorized party. For example, the resource might be a document that the authorized party desires to read or modify. However, at this point, the authorized party may be permitted to save a copy of the resource elsewhere without any security measures. In effect, the saved copy becomes an unsecured resource. If such is permitted, then the robustness of the security system is jeopardized. Therefore, there is a need to provide more effective ways for security systems to secure and protect resources.

SUMMARY OF THE INVENTION

The invention relates to improved approaches for securing files that are derived from secured files. In general, a secured file can only be accessed by authenticated users with appropriate access rights or privileges. Each secured file is provided with a header portion and a data portion, where the header portion contains, or points to, security information. The security information is used to determine whether access to associated data portions of secured files is permitted. These improved approaches can thus impose security on files that are derived from secured files. In one embodiment, files that are deemed derived from a secured file include files that are copies of the secured file. In another embodiment, files that are deemed derived from a secured file include files having content substantially similar to the content of the secured file.

The invention can be implemented in numerous ways, including as a method, system, device, and computer readable medium. Several embodiments of the invention are discussed below.

As a method for securing a copy of a secured file, the secured file having a header portion and a data portion, the header portion including at least access rules, and the data portion including at least data of the secured file, one embodiment of the invention includes at least the acts of: determining whether a file being closed is a copy of an existing secured file; and modifying a header portion of the file being closed to include at least a part of the header portion for the existing secured file when it is determined that the file being closed is a copy of an existing secured file.

As a method for securing a copy of a secured file, the secured file having a header portion and a data portion, the header portion including at least access rules, and the data portion including at least data of the secured file, another embodiment of the invention includes at least the acts of: receiving a request to open the secured file, the request being initiated by a user having user privileges; computing a first file signature based on at least a portion of the data portion of the secured file; temporarily storing the first file signature for the secured file; providing the data portion of the secured file to the user; subsequently receiving a request to close another file; computing a second file signature based on at least a portion of the data portion of the another file; determining whether the first file signature substantially matches the second file signature; and modifying the header portion of the another file to include at least the access rules of the secured file when it is determined that the first file signature substantially matches the second file signature, thereby securing the another file.

As a method for securing copies of a secured file, the secured file having a header portion and a data portion, the header portion including at least access rules, and the data portion including at least data of the secured file, still another embodiment of the invention includes at least the acts of: receiving, from a requestor, a request to access the secured file; and determining whether the requestor is authorized to access the secured file based on at least the access rules within the header portion of the secured file. Further, when it is determined that authorization is permitted, this embodiment of the invention includes the acts of: computing a file signature for at least a part of the data portion of the secured file, storing the file signature and at least a portion of the header portion in a security information table, decrypting data in the data portion, and returning the decrypted data to the requester. Alternatively, when it is determined that authorization is not permitted, this embodiment includes the act of denying the requestor access to the data portion. In addition, this embodiment can also include the act of determining whether a file being closed is a new file. When it is determined that the secured file is a new file, then this embodiment includes the acts of: computing a new file signature for at least a part of a data portion of the new file, and comparing the new file signature with file signatures stored in the security information table. Moreover, when the comparing indicates that the new file signature matches one of the file signatures in the security information table, this embodiment includes the act of securing the new file in the same manner by which the secured file is secured.

As a computer readable medium including at least computer program code for securing another file derived from a secured file, the secured file having a header portion and a data portion, the header portion including at least access rules, and the data portion including at least data of the secured file, one embodiment of the invention includes at least: computer program code for receiving a request to open the secured file, the request being initiated by a user having user privileges; computer program code for retrieving at least access rules from the header portion of the secured file; computer program code for determining whether the request to access the secured file by the user is permitted based on a comparison of the retrieved access rules with the user privileges; computer program code for providing the data portion of the secured file to the user when it is determined that the user is permitted to access the secured file; computer program code for computing a first file signature based on at least a portion of the data portion of the secured file; computer program code for temporarily storing the first file signature for the secured file; computer program code for subsequently receiving a request to close another file; computer program code for computing a second file signature based on at least a portion of the data portion of the another file; computer program code for comparing the second file signature to the first file signature to produce comparison information; computer program code for determining whether the another file should be secured based on the comparison information; and computer program code for securing the another file when it is determined that the another file should be secured.

Other objects, features, and advantages of the present invention will become apparent upon examining the following detailed description of an embodiment thereof, taken in conjunction with the attached drawings.

BRIEF DESCRIPTION OF THE DRAWINGS

These and other features, aspects, and advantages of the present invention will become better understood with regard to the following description, appended claims, and accompanying drawings wherein:

DETAILED DESCRIPTION OF THE INVENTION

The present invention relates to improved approaches for securing files that are derived from secured files. In general, a secured file can only be accessed by authenticated users with appropriate access rights or privileges. Each secured file is provided with a header portion and a data portion, where the header portion contains, or points to, security information. The security information is used to determine whether access to associated data portions of secured files is permitted. These improved approaches can thus impose security on files that are derived from secured files. In one embodiment, files that are deemed derived from a secured file include files that are copies of the secured file. In another embodiment, files that are deemed derived from a secured file include files having content substantially similar to the content of the secured file.

Secured files are files that require one or more keys, passwords, access privileges, etc. to gain access to their content. The security is often provided through encryption and access rules. The files, for example, can pertain to documents, multimedia files, data, executable code, images and text.

In the following description, numerous specific details are set forth in order to provide a thorough understanding of the present invention. However, it will become obvious to those skilled in the art that the present invention may be practiced without these specific details. The description and representation herein are the common meanings used by those experienced or skilled in the art to most effectively convey the substance of their work to others skilled in the art. In other instances, well-known methods, procedures, components, and circuitry have not been described in detail to avoid unnecessarily obscuring aspects of the present invention.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments mutually exclusive of other embodiments. Further, the order of blocks in process flowcharts or diagrams representing one or more embodiments of the invention do not inherently indicate any particular order nor imply any limitations in the invention.

Embodiments of the present invention are discussed herein with reference to FIGS. 1A-7B. However, those skilled in the art will readily appreciate that the detailed description given herein with respect to these figures is for explanatory purposes as the invention extends beyond these limited embodiments.

Figure 1A:
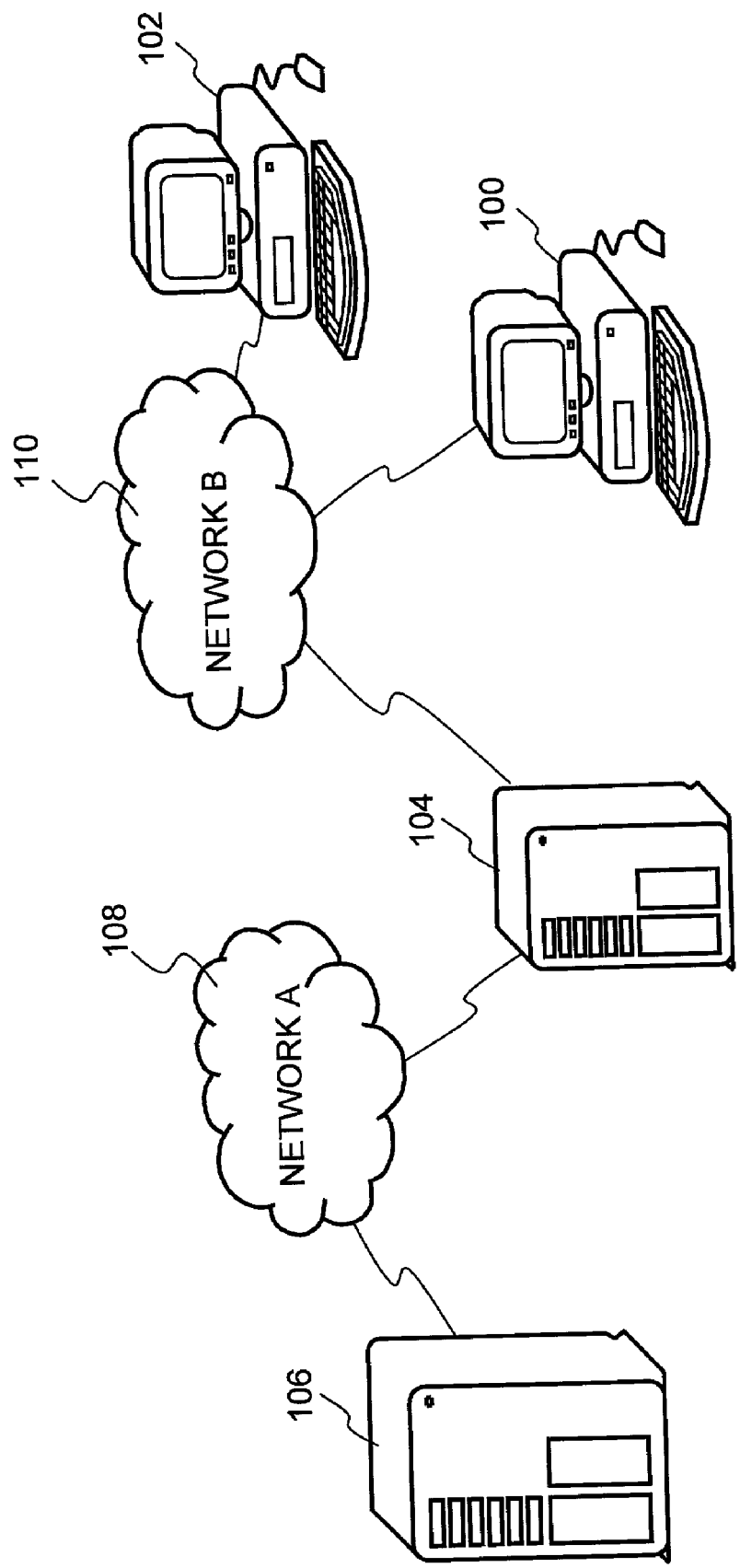
FIG. 1A shows a basic system configuration in which the invention may be practiced in accordance with an embodiment thereof.

FIG. 1A shows a basic system configuration in which the present invention may be practiced in accordance with one embodiment thereof. Documents or files may be created using an authoring tool executed on a client computer 100, which may be a desktop computing device, a laptop computer, or a mobile computing device. Exemplary authoring tools may include application programs such as Microsoft Office (e.g., Microsoft Word, Microsoft PowerPoint, and Microsoft Excel), Adobe FrameMaker and Adobe Photoshop.

According to one embodiment, the client computer 100 is loaded with a client module that is a linked and compiled, interpreted, or executable version of one embodiment of the present invention and is capable of communicating with a server 104 or 106 over a data network (e.g., the Internet or a local area network). According to another embodiment, the client computer 100 is coupled to the server 104 through a private link. As will be further explained below, a document or file created by an authoring tool can be secured by the client module. The client module, when executed, is configured to ensure that a secured document is secured at all times in a store (e.g., a hard disk or other data repository). The secured documents can only be accessed by users with proper access privileges. In general, an access privilege or access privileges for a user may include, but not be limited to, a viewing permit, a copying permit, a printing permit, an editing permit, a transferring permit, an uploading/downloading permit, and a location permit.

According to one embodiment, a created document is caused to go through an encryption process that is preferably transparent to a user. In other words, the created document is encrypted or decrypted under the authoring application so that the user is not aware of the process. A key (referred to herein as a user key) can be used to retrieve a file key to decrypt an encrypted document. Typically, the user key is associated with an access privilege for the user or a group of users. For a given secured document, only a user with a proper access privilege can access the secured document.

In one setting, a secured document may be uploaded via the network 110 from the computer 100 to a computing or storage device 102 that may serve as a central repository. Although not necessary, the network 110 can provide a private link between the computer 100 and the computing or storage device 102. Such link may be provided by an internal network in an enterprise or a secured communication protocol (e.g., VPN and HTTPS) over a public network (e.g., the Internet). Alternatively, such link may simply be provided by a TCP/IP link. As such, secured documents on the computer 100 may be remotely accessed.

In another setting, the computer 100 and the computing or storage device 102 are inseparable, in which case the computing or storage device 102 may be a local store to retain secured documents or receive secured network resources (e.g., dynamic Web contents, results of a database query, or a live multimedia feed). Regardless of where the secured documents or secured resources are actually located, a user, with proper access privilege, can access the secured documents or resources from the computer 100 or the computing or storage device 102 using an application (e.g., Internet Explorer, Microsoft Word or Acrobat Reader).

The server 104, also referred to as a local server, is a computing device coupled between a network 108 and the network 110. According to one embodiment, the server 104 executes a local version of a server module. The local version is a localized server module configured to service a group of designated users or client computers, or a location. Another server 106, also referred to as a central server, is a computing device coupled to the network 108. The server 106 executes the server module and provides centralized access control management for an entire organization or business. Accordingly, respective local modules in local servers, in coordination with the central server, form a distributed mechanism to provide distributed access control management. Such distributed access control management ensures the dependability, reliability and scalability of centralized access control management undertaken by the central server for an entire enterprise or a business location.

Figure 1B:
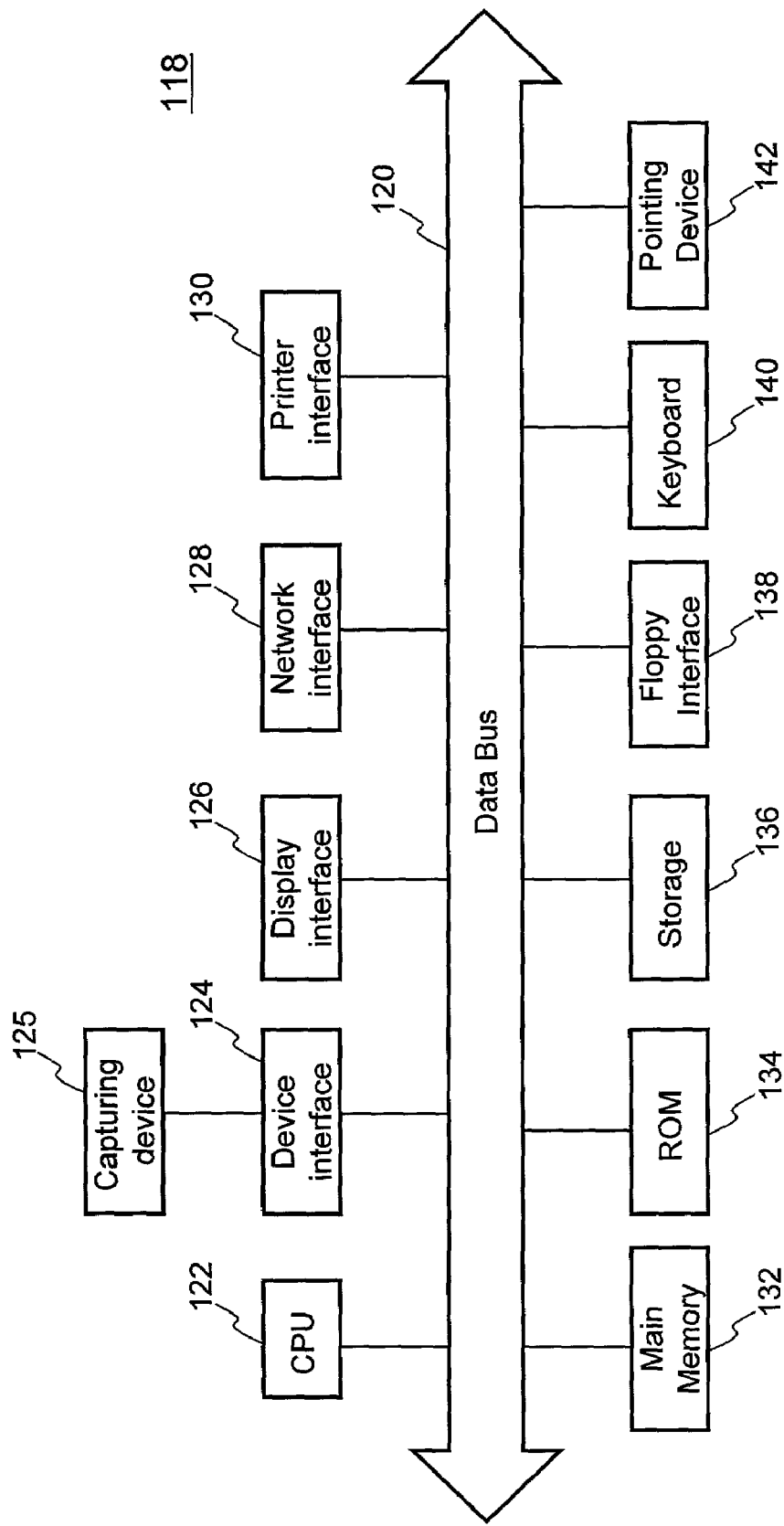
FIG. 1B shows internal construction blocks of a computing device in which the invention may be implemented and executed.

FIG. 1B shows internal construction blocks of a computing device 118 in which one embodiment of the present invention may be implemented and executed. The computing device 118 may correspond to a client device (e.g., computer 100, computing or storage device 102 in FIG. 1A) or a server device (e.g., server 104, 106 in FIG. 1A). As shown in FIG. 1B, the computing device 118 includes a central processing unit (CPU) 122 interfaced to a data bus 120. CPU 122 executes instructions to process data and perhaps manage all devices and interfaces coupled to data bus 120 for synchronized operations. The instructions being executed can, for example, pertain to drivers, operating system, utilities or applications. Device interface 124 may be coupled to an external device, such as the computing device 102 of FIG. 1A; hence, the secured documents therefrom can be received into memory 132 or storage 136 through data bus 120. Also interfaced to data bus 120 is a display interface 126, a network interface 128, a printer interface 130 and a floppy disk drive interface 138. Generally, a client module, a local module or a server module of an executable version of one embodiment of the present invention can be stored to storage 136 through floppy disk drive interface 138, network interface 128, device interface 124 or other interfaces coupled to data bus 120. Execution of such module by CPU 122 can cause the computing device 118 to perform as desired in the present invention. In one embodiment, the device interface 124 provides an interface for communicating with a capturing device 125 (e.g., a fingerprint sensor, a smart card reader or a voice recorder) to facilitate the authentication of a user of the computing device 118.

Main memory 132, such as random access memory (RAM), is also interfaced to data bus 120 to provide CPU 122 with instructions and access to memory storage 136 for data and other instructions. In particular, when executing stored application program instructions, such as for document securing or document accessing, CPU 122 is caused to manipulate the data to achieve results contemplated by the program instructions. Read-only memory (ROM) 134 is provided for storing executable instructions, such as a basic input/output operation system (BIOS) for operation of keyboard 140, display 126 and pointing device 142 which may be present.

In one embodiment, the computing or storage device 102 is capable of storing secured items (e.g., secured files) in the main memory 132 or the storage 136. The main memory 132 provides non-persistent (i.e., volatile) storage for the secured items and the storage 136 provides persistent (i.e., non-volatile) storage for the secured items. Hence, the computing or storage device 102, or more particularly, the main memory 132 and/or the storage 136 can act as a storage device for the secured items.

Figure 2A:
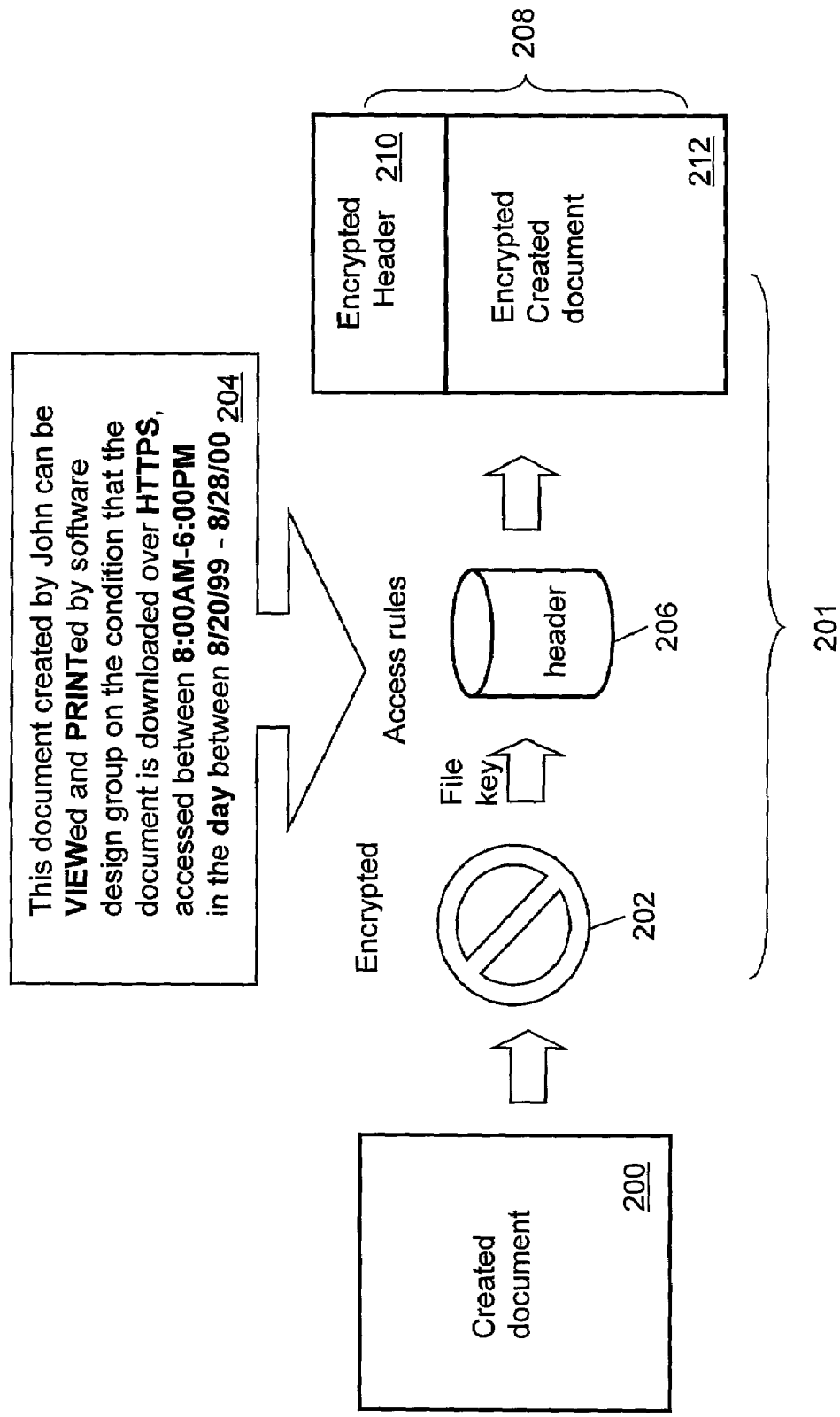
FIG. 2A is a block diagram of securing a created document according to one embodiment of the invention.

Referring now to FIG. 2A, a block diagram of securing a created document 200 is shown according to one embodiment of the invention. More generally, the created document 200 is a created file. After the document 200 is created with an application or authoring tool and upon an activation of a "Save," "Save As" or "Close" command, or automatic saving invoked by an operating system, the application itself or another application, the created document 200 is caused to undergo a securing process 201. The securing process 201 starts with an encryption process 202, namely, the document 200 that has been created or is being written into a store is encrypted by a cipher with a file key. In other words, the encrypted document could not be opened without the file key (i.e., a cipher key).

A set of access rules 204 for the document 200 is received and associated with a header 206. In general, the access rules 204 determine or regulate who and/or how the document 200, once secured, can be accessed. In some cases, the access rules 204 also determine or regulate when or where the document 200 can be accessed. Typically, a header is a file structure, small in size and includes, or perhaps links to, security information about a resultant secured document. Depending on an exact implementation, the security information can be entirely included in a header or pointed to by a pointer that is included in the header. According to one embodiment, the access rules 204, as part of the security information, are included in the header 206. According to another embodiment, the access rules 204, as part of the security information, are separately stored from the document 200 but referenced therein. The security information or the header 206 further includes a file key. Some or all of the header 206 can then be encrypted by a cipher with a user key associated with an authorized user to an encrypted header 210. The encrypted header 210 is attached to the encrypted document 212 to generate a secured document 208.

It is understood that a cipher may be implemented based on one of many encryption/decryption schemes. Examples of such schemes may include, but are not limited to: Data Encryption Standard algorithm (DES), Blowfish block cipher and Twofish cipher. Therefore, the operations of the present invention are not limited to a choice of those commonly-used encryption/decryption schemes. Any encryption/decryption scheme that is effective and reliable may be used. Hence, the details of encryption/decryption schemes are not further discussed herein so as to avoid obscuring aspects of the present invention.

According to one embodiment, to access the secured document 208, one needs to obtain the file key that is used to encrypt the document. To obtain the file key, one needs to be authenticated to get a user or group key and pass an access test in which the access rules in the security information are measured against the user's access privilege.

It should be noted that the header in a secured document may be configured differently than noted above without departing from the principles of the present invention. For example, a secured document may include a header with a plurality of encrypted headers, each can be accessible only by one designated user or a group users. Alternatively, a header in a secured document may include more than one set of security information or pointers thereto, each set being for one designated user or a group of users while a single file key can be used by all. Some or all of the access rules may be viewed or updated by users who can access the secured document.

As will be further described below, to access a secured document (or a secured file), a user needs a user key or keys to decrypt the encrypted security information or at least a portion of the header first. In one embodiment, the key or keys are associated with a user's login to a local server or a central server. Appropriate access privileges associated with the user are validated if the user has been authenticated or previously registered with the server and properly logged in. Depending on the permission or the access privileges, the access rules for the secured document determine whether the contents of the document shall be revealed to the user.

According to one embodiment, the access rules are present in a markup language, such as HTML, SGML and XML. In a preferred embodiment, the markup language is Extensible Access Control Markup Language (XACML) that is essentially an XML specification for expressing policies for information access. In general, XACML can address fine-grained control of authorized activities, the effect of characteristics of the access requestor, the protocol over which the request is made, authorization based on classes of activities, and content introspection (i.e., authorization based on both the requestor and attribute values within the target where the values of the attributes may not be known to the policy writer). In addition, XACML can suggest a policy authorization model to guide implementers of the authorization mechanism.

In general, a document is encrypted with a cipher (e.g., a symmetric or asymmetric encryption scheme). Encryption is the transformation of data into a form that is impossible to read without appropriate knowledge (e.g., a key). Its purpose is to ensure privacy by keeping information hidden from anyone to whom it is not intended, even those who have access to other encrypted data. Decryption is the reverse of encryption. Encryption and decryption generally require the use of some secret information, referred to as a key. For some encryption mechanisms, the same key is used for both encryption and decryption; for other mechanisms, the keys used for encryption and decryption are different.

For the purpose of controlling the access to the document, the key or keys, referred collectively to as a file key, may be the same or different keys for encryption and decryption and are preferably included in the security information contained in, or pointed to by, the header and, once obtained, can be used to decrypt the encrypted document. To ensure that the key is not to be retrieved or accessible by anyone, the key itself is guarded by the access privileges and rules. If a user requesting the document has the proper access privileges that can be granted by the access rules, the key will be retrieved to proceed with the decryption of the encrypted document.

To ensure that the security information or the header is not readily revealed, at least a portion of the header itself can be encrypted with a cipher. Depending on an exact implementation, the cipher for the header may or may not be identical to the one used for the document. The key (referred to as a user key) to decrypt the encrypted header can, for example, be stored in a local store of a terminal device and activated only when the user associated with it is authenticated. As a result, only an authorized user can access the secured document. Optionally, the two portions (i.e., the header (possibly encrypted) and the encrypted document) can be encrypted again and only decrypted by a user key. In another option, the encrypted portions (either one or all) can be error-checked by an error-checking portion, such as using a cyclical redundancy check to ensure that no errors have been incurred to the encrypted portion(s) of the secured document.

Figure 2B:
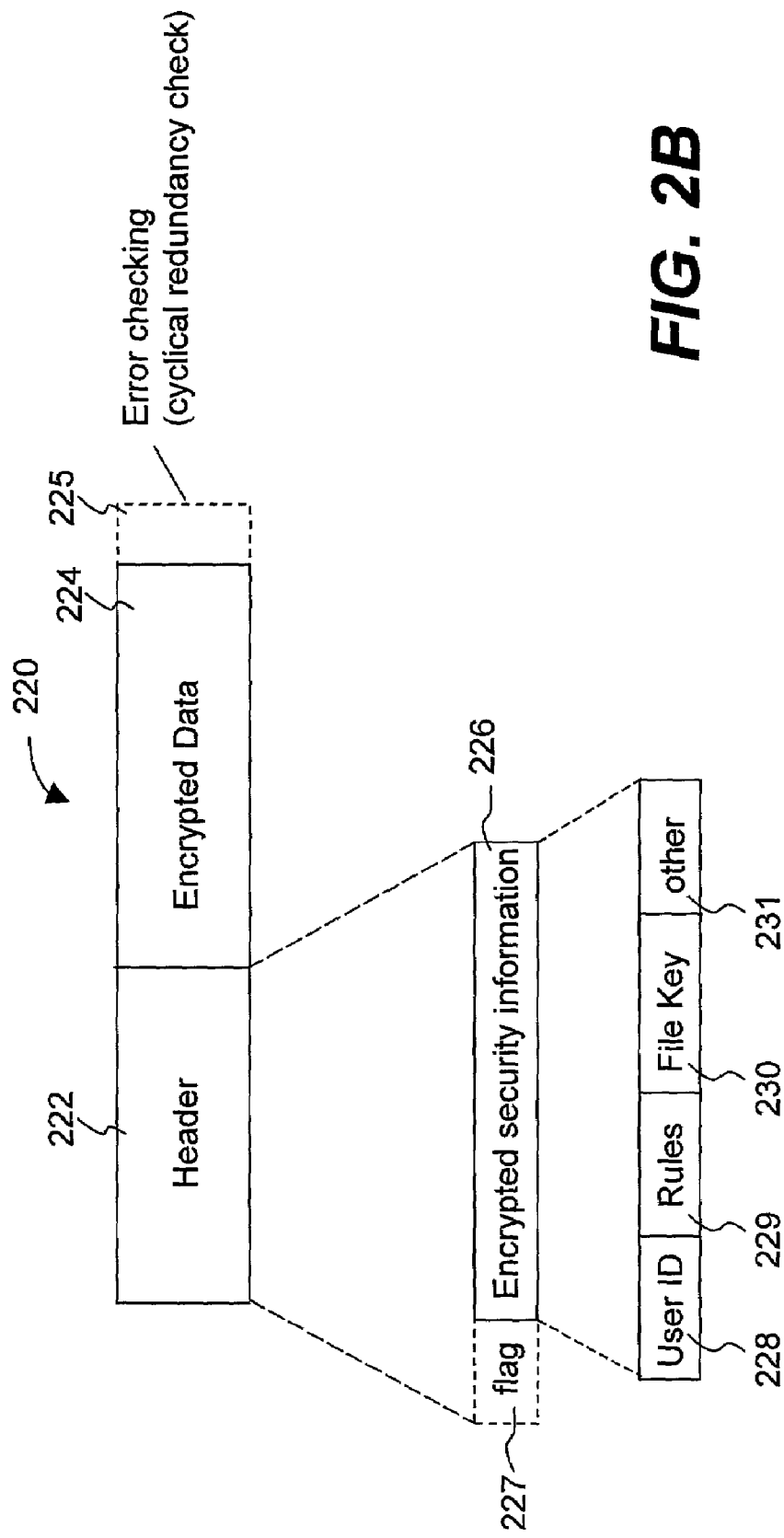
FIG. 2B is a diagram of a representative data structure for a secured file according to one embodiment.

FIG. 2B is a diagram of a representative data structure 220 for a secured file according to one embodiment. For example, the secured file can be the secured document 208 illustrated in FIG. 2A. The data structure 220 includes a header (or header portion) 222 and an encrypted data (or encrypted data portion) 224. The data structure 220 may also include an error-checking portion 225 that stores one or more error-checking codes, for example, a separate error-checking code for each block of data. For example, these error-checking codes can be associated with a Cyclical Redundancy Check (CRC) for the header 222 and/or the encrypted data. The header 222 includes a flag bit 227 and encrypted security information 226. The flag bit 227 indicates whether or not the data structure pertains to a file that is secured. The security information 226 can vary depending upon implementation. However, as shown in FIG. 2B, the security information 226 includes a user identifier (ID) 228, rules (access rules) 229, a file key 230 and other 231. The other 231 is additional space for other information to be stored within the security information 226. For example, the other information 231 may be used to include other information facilitating secure access to the secured file, such as version number or author identifier. The file key 230 is used to decrypt the encrypted data portion 214 so as to access the content or data of the secured file.

In an alternative data structure for a secured file, the header can include at least one pointer which points to a remote data structure stored in a storage device. The remote data structure can store some or all of the security information, thereby shortening the size of the header and improving manageability of security information. The storage device is typically a local storage device. In other words, the alternative data structure and the remote data structure are typically stored on a common machine (e.g., desktop or portable computer). The data structure 292 stores security information 294. Additional details on the alternative data structure can be found in U.S. application Ser. No. 10/132,712 (now abandoned), filed Apr. 26, 2002, and entitled "METHOD AND SYSTEM FOR PROVIDING MANAGEABILITY TO SECURITY INFORMATION FOR SECURED ITEMS," which is hereby incorporated herein by reference.

Figure 3:
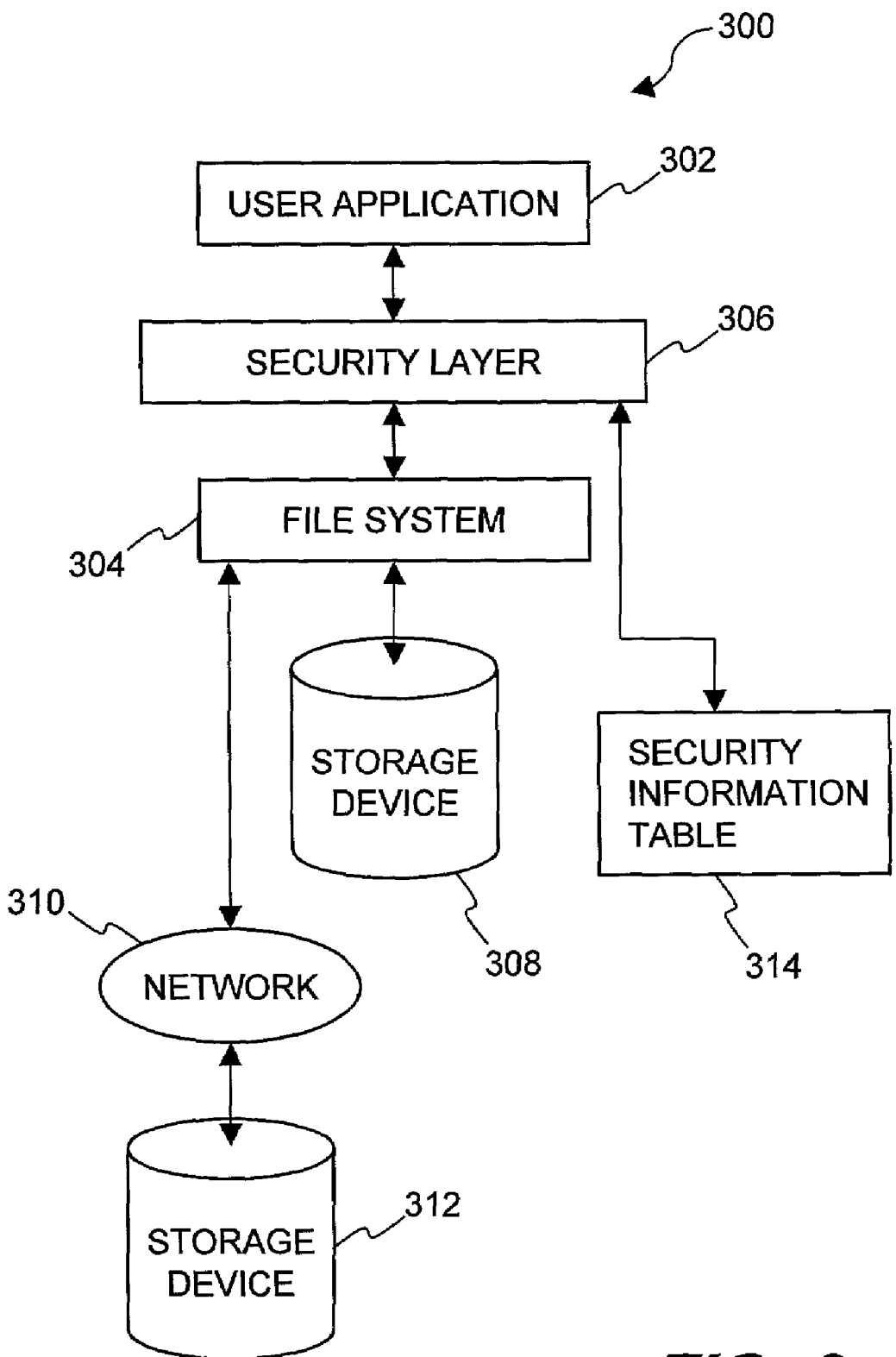
FIG. 3 is a block diagram of a file security system according to one embodiment of the invention.

FIG. 3 is a block diagram of a file security system 300 according to one embodiment of the invention. The file security system 300 operates to secure files such that access to such files can be limited. The file security system 300 includes a user application 302 that communicates with the file system 304 through a security layer 306. The file system 304 couples to a storage device 308, which can include a volume or a disk. The file system 304 also may couple to a network 310 having a storage device 312 coupled thereto.

The security layer 306 operates to monitor communications between the user application 302 and the file system 304. The security layer 306 can make a file being stored secure and can decide whether the user application (or its user) is permitted access to secured files. Moreover, subsequent to the security layer 306 determining that a secured file has been opened and the user application 302 has gained access to the secured file, the security layer 306 can detect when copies (exact, approximate or substantial copies) of the file have been made and stored to the file system 304. A security information table 314 can be stored in memory to assist the security layer 306 in determining when copies are being stored in the file system 304. When a copy of a secured file that is being made available to the user application 302 is stored to the file system 304, the copy can be stored such that it becomes secured in the same manner that the original secured file was secured. In one embodiment, the security information stored within the security information table 314 can be obtained and used when the copy is being stored to the file system 304. The copy may be stored by the file system 304 in the storage device 308 which may include a local volume or disk, or the storage device 312 which may include a remote volume or disk.

According to one embodiment which uses a Microsoft operating system (e.g., MS Windows NT), the user application 302 operates in a user mode while the security layer 306 and file system 304 are configured to operate in a kernel mode. Accordingly, one of the benefits or features in the present invention is that the security layer 306 can operate transparently with respect to a user who has activated the user application 302.

Figure 4:
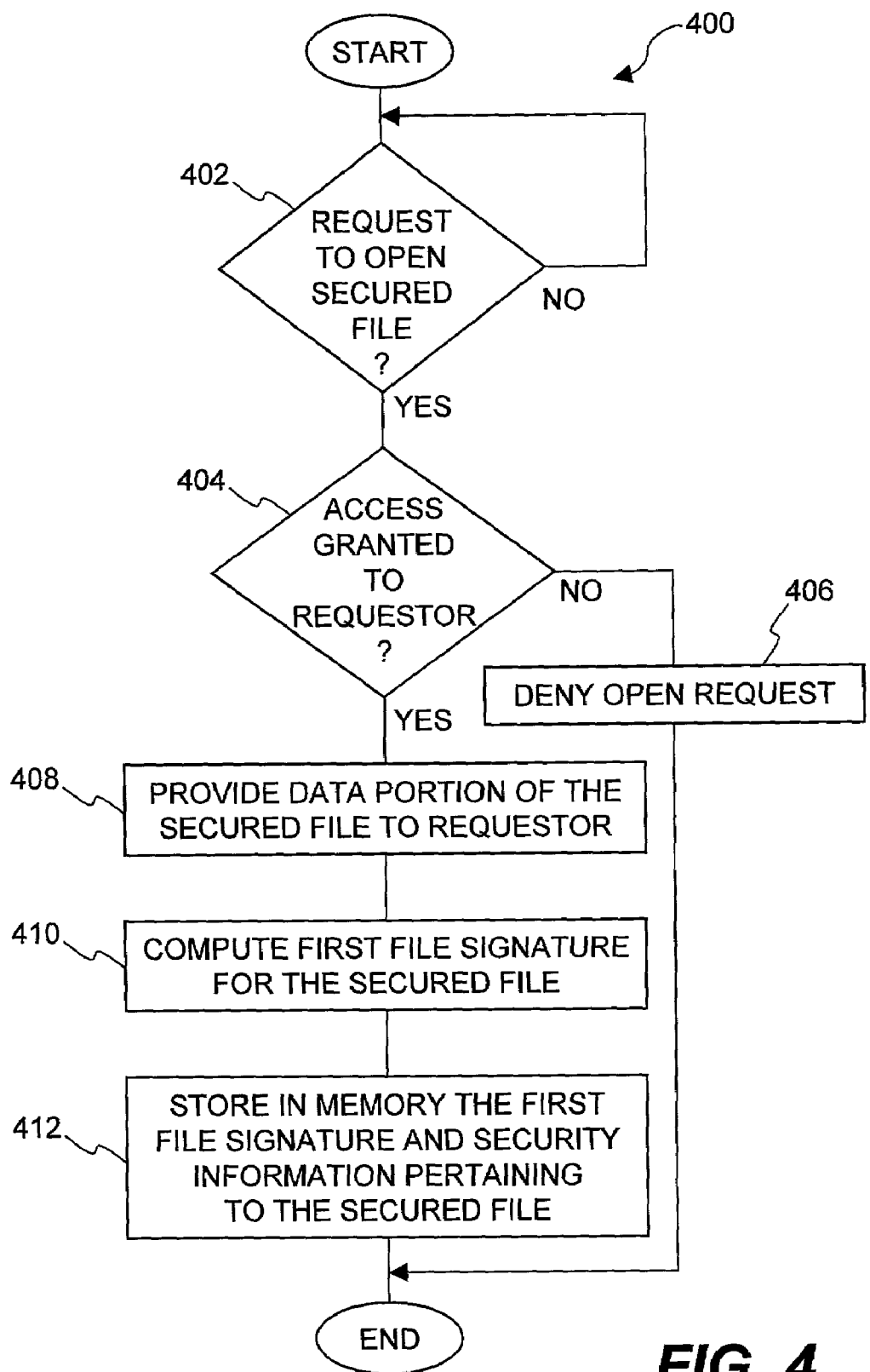
FIG. 4 is a flow diagram of secured file open processing according to one embodiment of the invention.

FIG. 4 is a flow diagram of secured file open processing 400 according to one embodiment of the invention. The secured file open processing 400 is, for example, performed by the file system 304 and the security layer 306 illustrated in FIG. 3.

The secured file open processing 400 begins with a decision 402 that determines whether a request to open a secured file has been received. When the decision 402 determines that a request to open a secured file has not yet been received, the secured file open processing 400 awaits such a request. In other words, the secured file open processing 400 can be deemed invoked once a request to open a secured file has been received.

Once a request to open a secured file has been received, a decision 404 determines whether access is granted to the requestor. Typically, the requestor is a hit user of the user application (e.g., the user application 302) which initiated the open request. The requester can also be considered the user application acting on behalf of the user. When the decision 404 determines that access is not granted to the requestor, then the open request is denied 406.

On the other hand, when the decision 404 determines that access by the requestor is granted, then the data portion of the secured file is provided 408 to the requester. In addition, a first file signature for the secured file is computed 410. Here, the first file signature can be computed 410 in a variety of different ways. In one embodiment, a first block of the data portion of the secured file is used to compute the first file signature. In one example, the signature can be based on a Cyclical Redundancy Code (CRC). Next, the first file signature and security information pertaining to the secured file is stored 412 in memory. The security information being stored 412 includes at least the access rules for gaining access to the secured file. In one embodiment, the security information can be the security information 226 (encrypted or unencrypted) illustrated in FIG. 2B. Typically, the memory is volatile memory such as random-access memory. Following the operation 412, as well as following the operation 406, the secured file open processing 400 is complete and ends.

Figure 5:
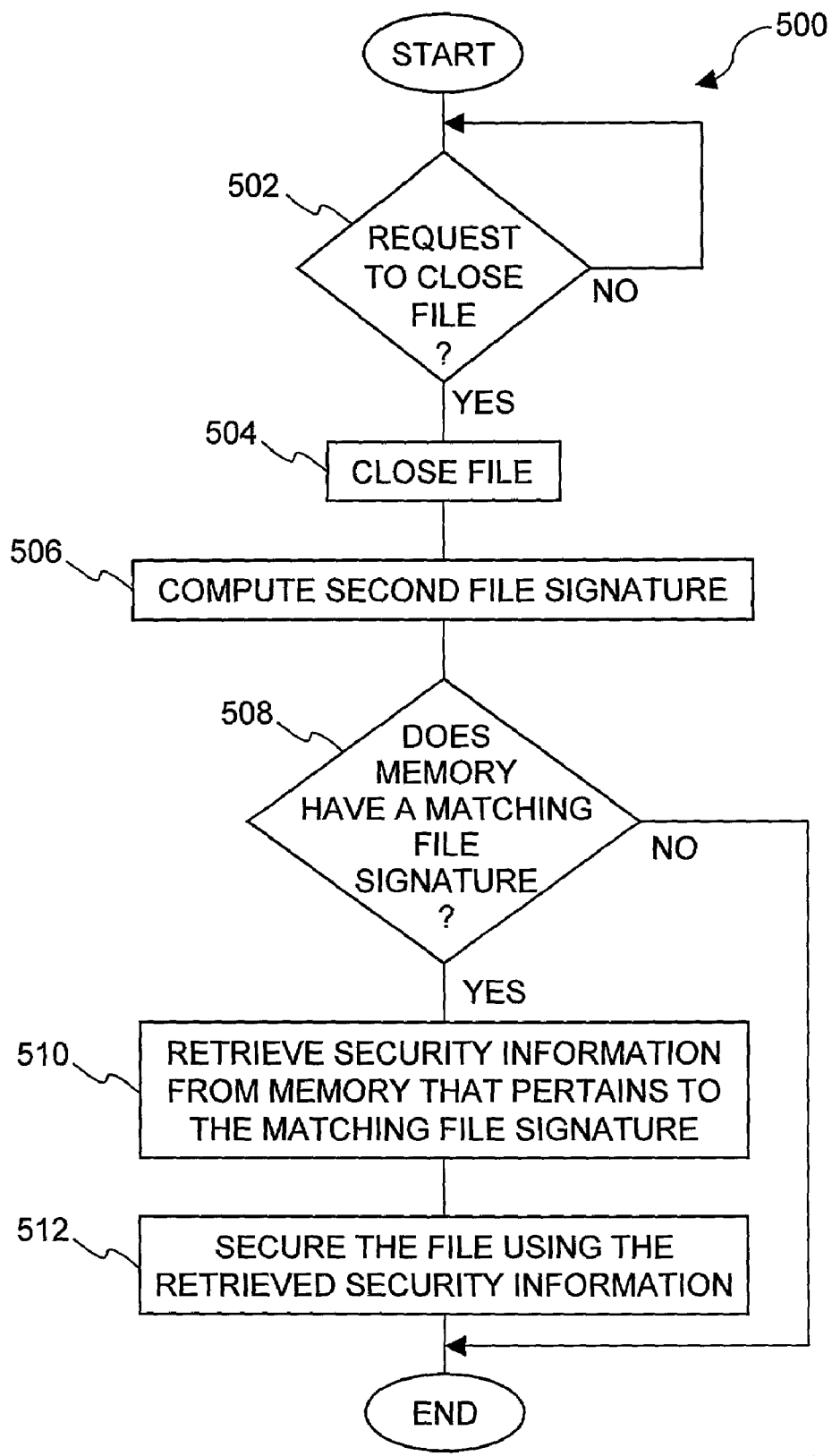
FIG. 5 is a flow diagram of file close processing according to one embodiment of the invention.

FIG. 5 is a flow diagram of file close processing 500 according to one embodiment of the invention. The file close processing 500 begins with a decision 502 that determines whether a request to close the file has been received. The file to be closed was previously open, such as by the secured file open processing 400 illustrated in FIG. 4. When the decision 502 determines that a request to close the file has not been received, the file close processing 500 awaits such a request. In other words, the file close processing 500 can be deemed invoked once a request to close a file has been received.

Once the decision 502 determines that a request to close a file has been received, the file is closed 504. The closing of the file can be performed in a conventional manner. In addition, a second file signature for the file is computed 506. The computation 506 of the second file signature would normally be performed in the same manner in which the first file signature was computed 410 by the secured file open processing 400. A decision 508 then determines whether the memory has a matching file signature. Here, the memory stores one or more of the first file signatures for secured files that have been opened. The memory is searched to determine whether any of the one or more stored file signatures matches the second file signature. When the decision 508 determines that there is no matching file signature in the memory, then the file close processing 500 is complete and ends with the file that has been closed not being secured. Here, the file close processing 500 does not secure the file being closed because that file is not considered to be a copy of a secured file previously opened.

Alternatively, when the decision 508 determines that the memory does have a matching file signature to that of the second file signature, the security information associated with the matching file signature is retrieved 510 from the memory. Then, the file (being closed) is secured 512 using the retrieved security information. Here, the file is deemed to be a copy of a secured file and thus the file is secured, preferably in the same manner in which the secured file was itself secured.

Figure 6A:
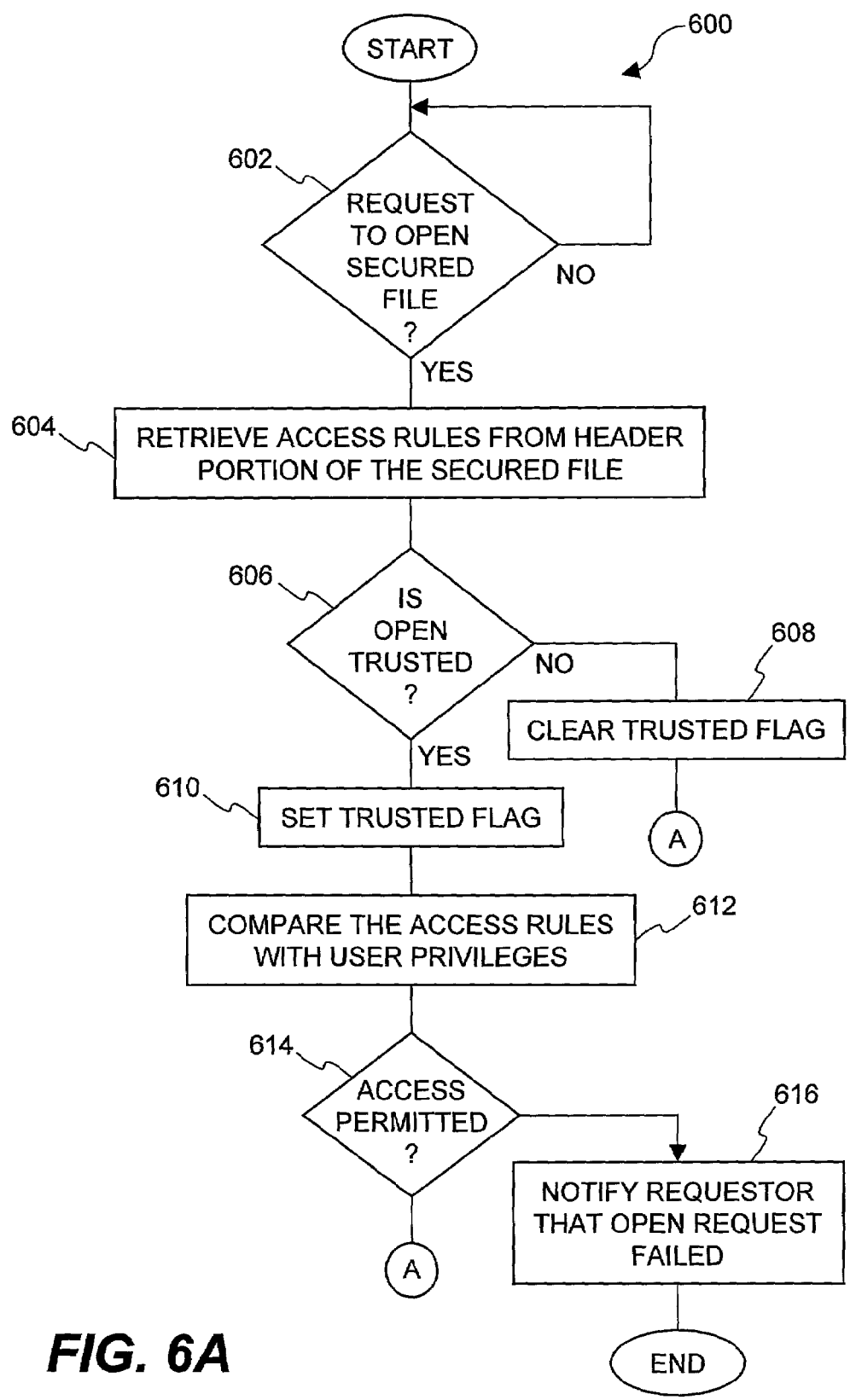
FIGS. 6A and 6B are flow diagrams of secured file open processing according to another embodiment of the invention.
Figure 6B:
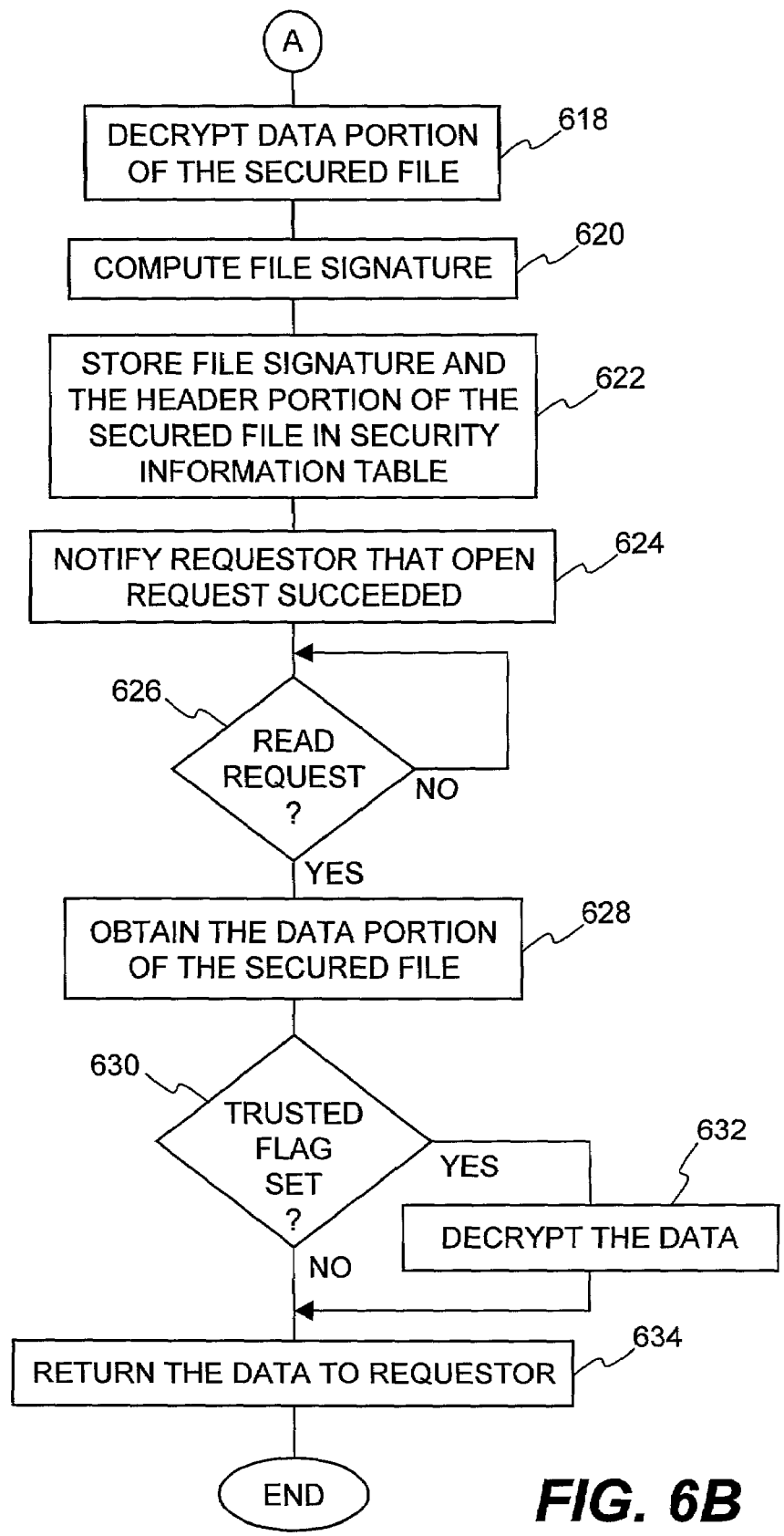

FIGS. 6A and 6B are flow diagrams of secured file open processing 600 according to another embodiment of the invention. The secured file open processing 600 operates to open a secured file. The secured file open processing 600 can, for example, represent a more detailed embodiment of the secured file open processing 400 illustrated in FIG. 4.

The secured file open processing 600 begins with a decision 602 that determines whether a request to open a secured file has been received. When the decision 602 determines that a request to open a secured file has not yet been received, the secured file open processing 600 awaits such a request. In other words, the secured file open processing 600 can be deemed invoked once a request to open a secured file has been received. In any case, once the decision 602 determines that a request to open a secured file has been received, access rules are retrieved 604 from a header portion of the secured file. Here, the secured file has a header portion and a data portion (see, e.g., FIG. 2B). The header portion includes security information, such as access rules. The security information within the header portion can be encrypted and thus may require a user key associated with the requestor in order to decrypt the security information.

Next, a decision 606 determines whether the open is trusted. The open is deemed to be trusted when the user application that issued the request to open can be trusted to protect the security of an open file. Typically, those user applications that are trusted are predetermined. When the decision 606 determines that the open is not trusted, then a trusted flag is cleared 608 and the open is successful regardless of the user's privileges or access rights.

Alternatively, when the decision 606 determines that the open is trusted, the trusted flag is set 610. Following the operation 610, the access rules (provided from the header portion of the secured file) are compared 612 with user privileges. Here, the requester is typically controlled by a user that has user privileges which define access rights to secured files. The comparison 612 of the user privileges with the access rules provided with the secured file is used to determine whether access to the secured file by the user is permitted. Namely, a decision 612 determines whether access to the secured file is permitted by the requestor (user) based on the results of the comparison 612. When the decision 614 determines that access to the secured file is not permitted, then the requestor is notified 616 that the open request has failed. Following the operation 616, the secured file open processing 600 is complete and ends with the open not having been performed.

On the other hand, when the decision 614 determines that access to the secured file is permitted or when the decision 606 determines that the open is not trusted, then the data portion of the secured file is decrypted 618. After the data portion has been decrypted 618, a file signature is computed 620. Here, some or all of the data portion of the secured file is being decrypted 618 so that a file signature can be computed 620. In one embodiment, the file signature is computed 620 from a first block of the data portion of the secured file. Then, the file signature and the header portion (e.g., security information) of the secured file is stored 622 in a security information table. For example, the security information table can be the security information table 314 illustrated in FIG. 3. Then, the requestor is notified 624 that the open request has succeeded.

With the open being successful, the data from the data portion of the secured file can then be read and supplied to the requestor (e.g., user application). In this regard, a decision 626 determines whether a read request has been received. Once the decision 626 determines that a read request has been received, then the data portion of the secured file is obtained 628. A decision 630 then determines whether the trusted flag is set. When the decision 630 determines that the trusted flag is set, then the data of the data portion of the secured file is decrypted 632. Note that the trusted flag is set when the user application that issued the request to open can be trusted to protect the security of the secured file. Alternatively, when the decision 630 determines that the trusted flag is not set, then the data of the data portion of the secured file is not decrypted. Following the operations 630 and 632, the data is returned 634 to the requester. Hence, the data being returned to the requestor may or may not be decrypted and thus usable by the requestor. Following the operation 634, the secured file open processing 600 is complete and ends.

Figure 7A:
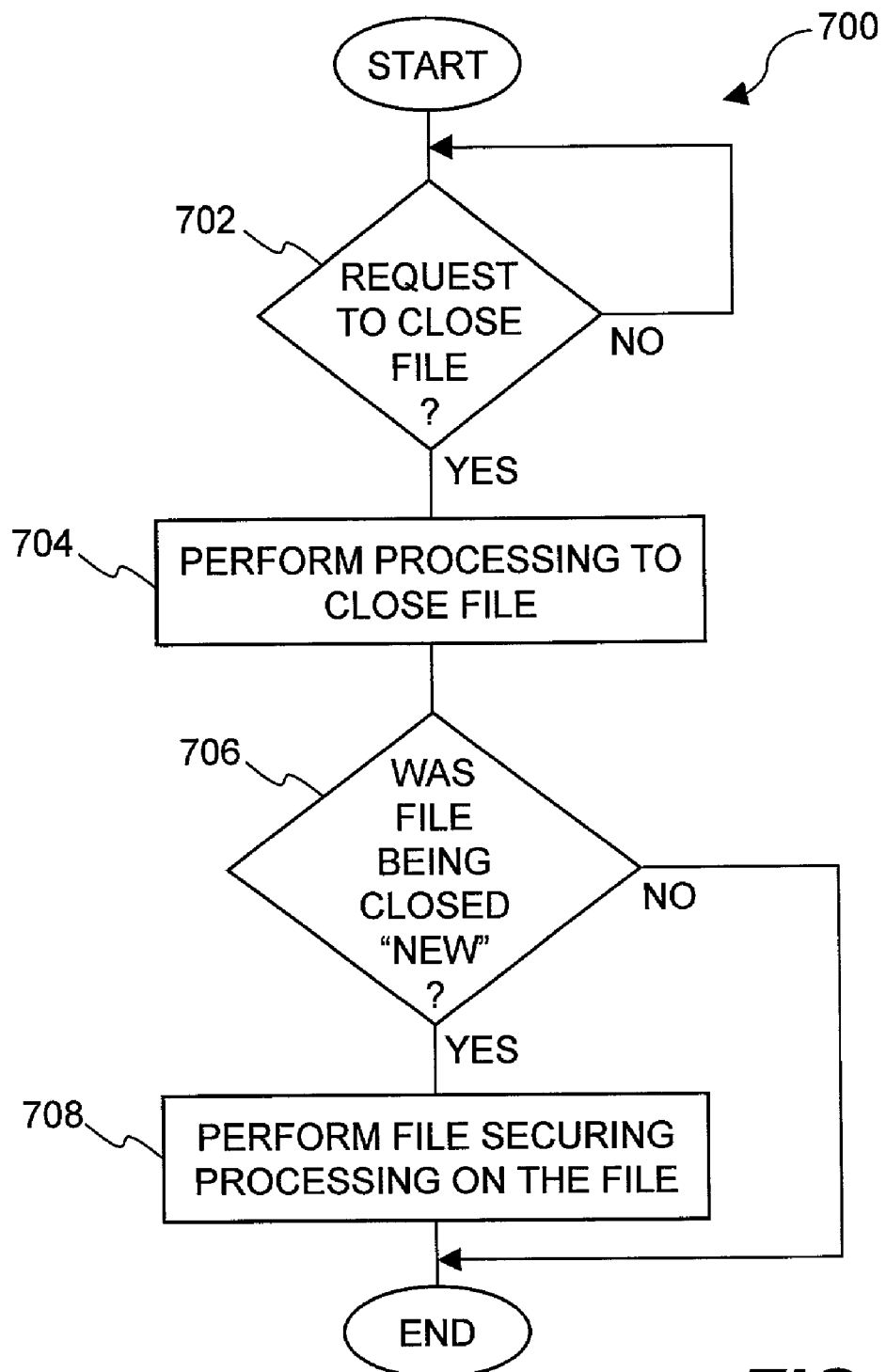
FIG. 7A is a flow diagram of file close processing according to another embodiment of the invention.

FIG. 7A is a flow diagram of file close processing 700 according to another embodiment of the invention. The file close processing 700 begins with a decision 702 that determines whether a request to close a file has been received. When the decision 702 determines that a request to close a file has not yet been received, the file close processing 700 awaits such a request. In other words, the file close processing 700 can be deemed invoked once a request to close a file has been received.

After a request to close a file has been received, processing is performed 704 to close the file. Here, such processing is performed in a conventional manner to have a file system close a previously opened file. Next, a decision 706 determines whether the file being closed is deemed a "new" file. According to one embodiment, a new file is a file that at one point had a length of zero, meaning that it had no data at some point. When the decision 706 determines that the file being closed is "new," then the file securing processing can be performed 708 on the file. The file securing processing that is performed 708 on the file serves to secure the file, if appropriate. More specifically, when the file to be closed is determined to be a copy of a secured file, the file securing processing that is performed 708 operates to secure the file being closed such that it is secured just as is the original secured file.

Figure 7B:
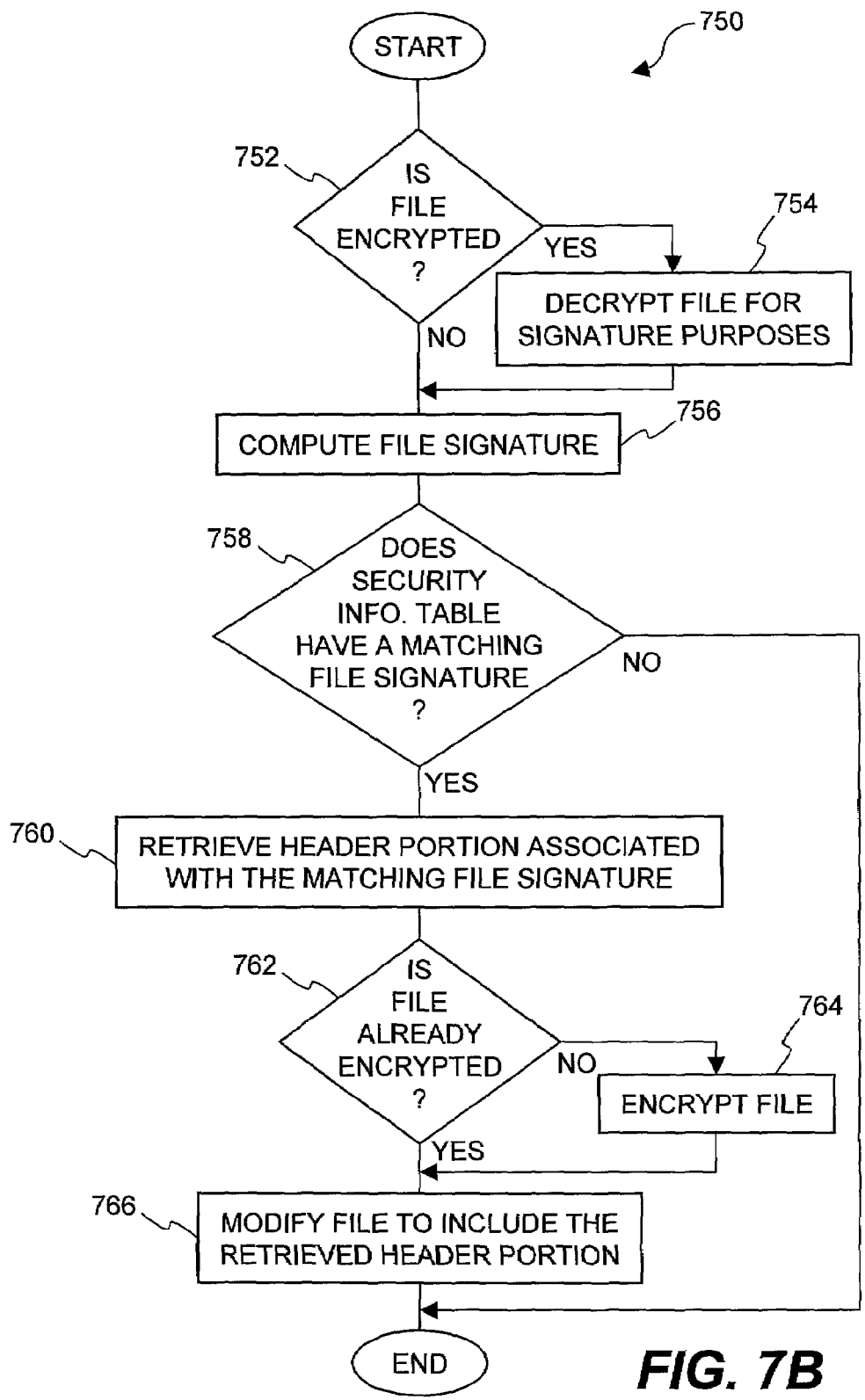
FIG. 7B is a flow diagram of file securing processing according to one embodiment of the invention.

FIG. 7B is a flow diagram of file securing processing 750 according to one embodiment of the invention. The file securing processing 750 is, for example, suitable for use as the file securing processing of block 708 illustrated in FIG. 7A.

The file securing processing 750 begins with a decision 752 that determines whether the file is encrypted. When the decision 752 determines that the file is encrypted, then the file is decrypted 754 for signature purposes. In other words, the file can be decrypted 754 to the extent needed in order to compute a signature for the file. Following the operation 752 when the file is not encrypted, or following the operation 754 when the file is encrypted, a file signature is computed 756. In one embodiment, the file signature is computed from a block of the data portion of the file. The file signature is computed 756, preferably in the same manner that the file signature is computed 620 in the secured file open processing 600.

Next, a decision 758 determines whether there is a matching file signature within the security information table. When the decision 758 determines that there is no matching file signature within the security information table, then the file securing processing 750 is complete and ends with the file not being secured. In this case, the file being closed is not identified as being a copy of a previously opened secured file. As a result, the file being closed is not secured.

On the other hand, when the decision 758 determines that the security information table does have a matching file signature, the header portion associated with the matching file signature is retrieved 760. In one embodiment, the header portion associated with the matching file signature is stored in the security information table and thus can be retrieved 760 therefrom. A decision 762 then determines whether the file is already encrypted. When the decision 762 determines that the file is not already encrypted, then the file is encrypted 764 so as to secure at least the data portion of the file. Alternatively, the operation 764 is bypassed if the decision 762 determines that the file is already encrypted. Following the operations 762 and 764, the file is modified 766 to include the retrieved header portion. In other words, the file is modified 766 to include the header portion that serves to include security information in the file. The resulting file is a secured file that is not only has its data encrypted but also carries with it security information governing its access. Following the operation 766, the file securing processing 750 is complete and ends.

Optionally, in determining whether a matching signature is stored in memory, beside comparing signatures of the previously opened files and the file being closed, respective file lengths can also be used. For example, for a match to be found, not only must the signature for a portion of the file match but the respective file lengths must also match. For example, the decision 758 can seek a matching signature and a matching length in checking for a match in the security information table. In FIG. 6B, the length of the secured file can also be stored 622 in the security information table as secured files are opened. In the secured file open processing 400 of FIG. 4, a file length as well as the first file signature can be computed 410 for the secured file, and then stored 412 in memory. The file close processing 500 can also perform the decision 508 such that a matching length and a matching file signature are required. Also, if desired, the signatures could be on the complete data portion of the files for greater reliability at the cost of performance degradation.

Still further, the memory (e.g., the security information table) that stores the signatures (and possibly the file lengths) as well as the associated security information can be managed to ensure that memory resources are not overly utilized. For example, in one embodiment, each corresponding entry in the memory can be removed from the memory after a predetermined duration. For example, a few minutes after the associated file that placed the entry in the memory is closed, the entry can be eliminated from the memory. In another embodiment, an amount of memory can be allocated for storage of these entries, and when the allocated storage is full or nearly full, then entries can be expired (e.g., oldest entry first) and thus eliminated from the memory.

In the above description of the invention, a copy of a secured file is identified so as to be able to impose security on the copy. However, it should be understood that a copy in this regard is not limited to an exact copy but can include a substantial or approximate copy. As a result, not only can exact copies of secured files be secured, but also files that are substantially similar (i.e., substantial copies) to secured files can be secured. For example, in determining matching signatures, a comparison of two signatures can produce a difference value. Then, if the difference value is below a threshold level, the signatures can be said to match and thus identify a file that is a copy of a secured file. More generally, the comparison of signatures of files can use an approximate signature comparison technique. An approximate signature comparison technique is used to determining matching signatures even though the files are not exact copies. A plurality of different signature comparison techniques could also be used, such that the determination of matching signatures could be considered in different ways. For example, if one of a plurality of different signal comparison techniques were to indicate a match, then the files can be deemed copies. Still further, the particular approximate signature comparison technique being utilized can also vary with the type of file. For example, if the file being examined to determine if it is a copy is a text file, one particular approximate signature comparison technique could first translate non-English text into English, generate a signature, and then check for a match. One particular approximate signature comparison technique could allow a copy of a secured file to be detected when the difference between the files is only a difference in language.

The invention is preferably implemented by software, but can also be implemented in hardware or a combination of hardware and software. The invention can also be embodied as computer readable code on a computer readable medium. The computer readable medium is any data storage device that can store data which can thereafter be read by a computer system. Examples of the computer readable medium include read-only memory, random-access memory, CD-ROMs, DVDs, magnetic tape, and optical data storage devices. The computer readable medium can also be distributed over network-coupled computer systems so that the computer readable code is stored and executed in a distributed fashion.

The various embodiments, implementations and features of the invention noted above can be combined in various ways or used separately. Those skilled in the art will understand from the description that the invention can be equally applied to or used in other various different settings with respect to various combinations, embodiments, implementations or features provided in the description herein.

The advantages of the invention are numerous. Different embodiments or implementations may yield one or more of the following advantages. One advantage of the invention is that copies of secured files are able to be secured. Another advantage of the invention is that exact or substantial copies of secured files are able to be secured. Still another advantage of the invention is that security can be transparently imposed on copies of secured files.

The foregoing description of embodiments is illustrative of various aspects/embodiments of the present invention. Various modifications to the present invention can be made to the preferred embodiments by those skilled in the art without departing from the true spirit and scope of the invention as defined by the appended claims. Accordingly, the scope of the present invention is defined by the appended claims rather than the foregoing description of embodiments.

What is claimed is:

1. A method for securing a copy of a secured file, the secured file having a header portion and a data portion, the header portion including at least access rules, and the data portion including at least data of the secured file, the method comprising:

determining whether a file being closed is a copy of an existing secured file, wherein the determining comprises comparing a first signature of a portion of the file being closed with a second signature of a like portion of the existing secured file, and wherein when the first signature matches the second signature, the file being closed is deemed to be a copy of the existing secured file; and modifying a header portion of the file being closed to include at least a part of the header portion for the existing secured file when the determining determines that the file being closed is a copy of an existing secured file.

2. The method as recited in claim 1, wherein the modifying operates to include at least the access rules from the header portion of the existing secured file within the header portion of the file.

3. The method as recited in claim 1, wherein the signature is produced using a cyclic redundancy code.

4. The method as recited in claim 1, wherein when the first signature substantially matches the second signature, the file being closed is deemed to be a copy of the existing secured file.

5. The method as recited in claim 1, wherein when the first signature and the second signature are within a predetermined tolerance of being identical, the file being closed is determined to be a copy of the existing secured file.

6. The method as recited in claim 1, wherein the portion of the file being closed for the first signature is a first block of data of the data portion of the file being closed, and wherein the like portion of the existing secured file for the second signature is a first block of data of the data portion of the existing secured file.

7. The method as recited in claim 1, wherein the determining comprises:

comparing a first signature of a portion of the file being closed with a second signature of a like portion of the existing secured file; and comparing a first file length for the file being closed with a second file length for the existing secured file.

8. The method as recited in claim 7, wherein when both the first signature matches the second signature and the first file length matches the second file length, the file being closed is deemed to be a copy of the existing secured file.

9. The method as recited in claim 7, wherein when both the first signature substantially matches the second signature and the first file length substantially matches the second file length, the file being closed is deemed to be a copy of the existing secured file.

10. The method as recited in claim 1, wherein the modifying step operates to include at least the access rules from the header portion of the existing secured file within the header portion of the file.

11. The method as recited in claim 1, wherein the method further comprises:

encrypting the file being closed unless already encrypted.

12. The method as recited in claim 1, wherein the method further comprises:

subsequently receiving, from a requester, a request to access the file to be closed after the file has been closed; and determining whether the requestor is authorized to access the closed file based on at least the access rules within the header portion of the existing secured file.

13. The method as recited in claim 1, wherein the file being closed is being closed with respect to a file system.

14. The method as recited in claim 1, wherein the determining step determines whether the file being closed is at least an approximate copy of the existing secured file.

15. The method as recited in claim 1, wherein the determining step determines whether the file being closed is an exact copy of the existing secured file.

16. A method for securing a copy of a secured file, the secured file having a header portion and a data portion, the header portion including at least access rules, and the data portion including at least data of the secured file, the method comprising:

receiving a request to open the secured file, the request being initiated by a requestor associated with user privileges, wherein the requestor is one or more of a user, a group of users, and a user application;

computing a first file signature based on at least a portion of the data portion of the secured file;

storing the first file signature for the secured file;

providing the data portion of the secured file to the requestor;

subsequently receiving a request to close another file;

computing a second file signature based on at least a portion of the data portion of the another file;

determining whether the first file signature substantially matches the second file signature; and modifying the header portion of the another file to include at least the access rules of the secured file when the determining step determines that the first file signature substantially matches the second file signature, thereby securing the another file.

17. The method as recited in claim 16, wherein the method further comprises:

encrypting the another file being closed unless already encrypted.

18. The method as recited in claim 16, wherein computing the first file signature is based on a decrypted version of at least a portion of the data portion of the secured file, and wherein computing the second file signature is based on a decrypted version of at least a portion of the data portion of the another file.

19. The method as recited in claim 16, wherein following the receiving and prior to computing the first file signature, the method further comprises:

retrieving at least access rules from the header portion of the secured file; and determining whether the request to access the secured file by the requestor is permitted based on a comparison of the retrieved access rules with the user privileges.

20. The method as recited in claim 19, wherein computing the first file signature through the modifying is bypassed to deny the requestor access to the secured file when the determining determines that the requestor is not permitted access to the secured file.

21. The method as recited in claim 19, wherein the providing provides the data portion of the secured file to the requestor only when the determining step determines that the requestor is permitted access to the secured file.

22. The method as recited in claim 16, wherein the providing comprises:
   decrypting the data portion of the secured file; and
   providing the decrypted data portion of the secured file to the requestor.

23. The method as recited in claim 16, wherein the storing temporarily stores the first file signature together with at least the access rules of the header portion for the secured file.

24. The method as recited in claim 23, wherein the temporary storage is in a security information table.

25. The method as recited in claim 16, wherein the method further comprises:
   determining whether the another file is a new file; and
   wherein the computing a second file signature through the modifying is bypassed such that the another file is not secured when the determining determines that the another file is not a new file.

26. The method as recited in claim 25, wherein the determining operates to determine whether the length of the another file was zero while opened.

27. A method for securing copies of a secured file, the secured file having a header portion and a data portion, the header portion including at least access rules, and the data portion including at least data of the secured file, the method comprising:
   receiving, from a requester, a request to access the secured file;
   determining whether the requestor is authorized to access the secured file based on at least the access rules within the header portion of the secured file;
   when the determining determines that authorization is permitted, computing a file signature for at least a part of the data portion of the secured file, storing the file signature and at least a portion of the header portion in a security information table, decrypting data in the data portion, and returning the decrypted data to the requestor;
   when the determining determines that authorization is not permitted, denying the requester access to the data portion;
   determining whether a file being closed is a new file;
   when the determining determines that the secured file is a new file, computing a new file signature for at least a part of a data portion of the new file, and comparing the new file signature with file signatures stored in the security information table; and
   when the comparing indicates that the new file signature matches one of the file signatures in the security information table, securing the new file in the same manner by which the secured file is secured.

28. A computer readable medium having stored thereon computer program code that, if executed by a computer, causes the computer to perform a method for securing another file derived from of a secured file, the secured file having a header portion and a data portion, the header portion including at least access rules, and the data portion including at least data of the secured file, the method comprising:
   receiving a request to open the secured file, the request being initiated by a requestor associated with user privileges, wherein the requestor is one or more of a user, a group of users, and a user application;
   retrieving at least access rules from the header portion of the secured file;
   determining whether the request to access the secured file by the requestor is permitted based on a comparison of the retrieved access rules with the user privileges;
   providing the data portion of the secured file to the requestor when it is determined that the requestor is permitted to access the secured file;
   computing a first file signature based on at least a portion of the data portion of the secured file;
   storing the first file signature for the secured file;
   subsequently receiving a request to close another file;
   computing a second file signature based on at least a portion of the data portion of the another file;
   comparing the second file signature to the first file signature to produce comparison information;
   determining whether the another file should be secured based on the comparison information; and
   securing the another file when it is determined that the another file should be secured.

29. The computer readable medium as recited in claim 28, wherein the securing the another file modifies the header portion of the another file to include at least the access rules of the secured file.

30. The computer readable medium as recited in claim 29, wherein the securing the another file encrypts the another file being closed unless already encrypted.

31. The computer readable medium as recited in claim 29, wherein the computing the first file signature is based on a decrypted version of at least a portion of the data portion of the secured file, and wherein computing the second file signature does so based on a decrypted version of at least a portion of the data portion of the another file.

32. A method for securing a copy of a secured file having a header portion and a data portion, wherein the header portion includes at least access rules, and wherein the data portion includes at least data of the secured file, the method comprising:
   receiving a request to open the secured file, wherein the request is associated with a requestor having user privileges, wherein the requestor is one or more of a user, a group of users, and a user application;
   computing a first file signature based on at least a portion of the data portion of the secured file;
   storing the first file signature for the secured file;
   providing the data portion of the secured file to the requestor;
   subsequently receiving a request to close another file;
   computing a second file signature based on at least a portion of the data portion of the another file;
   determining whether the first file signature substantially matches the second file signature, wherein the determining operates to determine whether the length of the another file was zero while opened;
   modifying the header portion of the another file to include at least the access rules of the secured file when the determining determines that the first file signature substantially matches the second file signature, thereby securing the another file; and
   determining whether the another file is a new file, wherein the computing a second file signature through the modifying is bypassed such that the another file is not secured when the determining determines that the another file is not a new file.

* * * * *